(12) United States Patent
Hrischuk et al.

(10) Patent No.: US 9,542,115 B1
(45) Date of Patent: Jan. 10, 2017

(54) METHODS AND SYSTEMS FOR TROUBLE SHOOTING PERFORMANCE ISSUES IN NETWORKED STORAGE SYSTEMS

(71) Applicant: NETAPP, INC., Sunnyvale, CA (US)

(72) Inventors: Curtis Hrischuk, Holly Springs, NC (US); David Gilbert Roberts, Winthrop, MA (US); Ulhas Pai, Woburn, MA (US); Kushagra Mittal, Waltham, MA (US); Peter Adam Smith, Bolton, MA (US); Purushottam Jha, Waltham, MA (US)

(73) Assignee: NETAPP, INC., Sunnyvale, CA (US)

( * ) Notice: Subject to any disclaimer, the term of this patent is extended or adjusted under 35 U.S.C. 154(b) by 58 days.

(21) Appl. No.: 14/747,313

(22) Filed: Jun. 23, 2015

(51) Int. Cl.
  *G06F 12/00* (2006.01)
  *G06F 3/06* (2006.01)
  *H04L 29/08* (2006.01)
  *H04L 12/26* (2006.01)

(52) U.S. Cl.
  CPC .......... *G06F 3/0631* (2013.01); *G06F 3/0604* (2013.01); *G06F 3/067* (2013.01); *H04L 43/045* (2013.01); *H04L 43/0852* (2013.01); *H04L 67/1097* (2013.01)

(58) Field of Classification Search
  CPC ..... G06F 3/0631; G06F 3/067; H04L 67/1097
  USPC ........................................................ 711/154
  See application file for complete search history.

(56) References Cited

U.S. PATENT DOCUMENTS

2013/0179657 A1* 7/2013 Isomura ................ G06F 3/0605
                                                   711/165

* cited by examiner

*Primary Examiner* — Jae Yu
(74) *Attorney, Agent, or Firm* — Klein, O'Neill & Singh, LLP

(57) ABSTRACT

Methods and systems for managing resources in a storage system are provided. The methods include tracking performance of a plurality of resources used for reading and writing information at storage devices in a networked storage system, each resource represented by a logical object in a hierarchical structure and performance data associated with each logical object is maintained by a processor executing a management application out of a memory device; identifying a root object associated with a resource having a performance issue as indicated by a threshold violation for the resource; selecting a related object associated with a resource similar to the resource of the root object by the management application for comparing performance data of the root object with the related object; and using the comparison to verify that the root object is a root cause of the performance issue.

20 Claims, 22 Drawing Sheets

QOS Delay Centers

| Root Object Type | Physical Parent | Logical Parent | Physical Peer | Logical Peer | Physical Child | Logical Child | Workloads | HA Partner |
|---|---|---|---|---|---|---|---|---|
| Cluster 302 | N/A | | N/A | N/A | Nodes | SVMs | N/A | N/A |
| Node 306 | | | Nodes on same cluster | | Aggregates on same node Ports/NICs on same node | | | Peer node |
| Aggregate 316 | Node | | Aggregate on same node | N/A | N/A | Volumes on same aggregate | HDD aggregate utilization | |
| Port 320 (includes NIC) | Node | | Ports/NICs on same node Ports in same port set | N/A | N/A | LIFs on same port | N/A | N/A |
| SVM 324 | N/A | | N/A | SVMs in same cluster | N/A | Volumes, and LIFs of this SVM | N/A | N/A |
| Volume 328 | Node and aggregate of this volume | SVM with this volume | | Volumes on same aggregate | N/A | LUNs in this volume | Volumes on same aggregate - utilization | |
| LUN 330 | Node and aggregate of this volume | Volume that contains this LUN | | LUNS in same volume | N/A | N/A | N/A | N/A |
| LIF 322 | Port that this LIF is on | SVM with this LIF | LIFs on same port/NIC | LIFs on same SVM | N/A | N/A | N/A | N/A |

METHODS AND SYSTEMS FOR TROUBLE SHOOTING PERFORMANCE ISSUES IN NETWORKED STORAGE SYSTEMS

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights.

TECHNICAL FIELD

The present disclosure relates to trouble shooting performance issues in a networked storage system.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is a metric used in a storage environment to provide certain throughput for processing input/output (I/O) requests, a response time goal within, which I/O requests are processed and a number of I/O requests processed within a given time (for example, in a second (IOPS). Throughput means an amount of data transferred within a given time in response to the I/O requests, for example, in megabytes per second (Mb/s).

To process an I/O request to read and/or write data, various resources are used within a storage system, for example, network resources, processors, storage devices and others. The different resources perform various functions in processing the I/O requests.

As storage systems continue to expand in size, complexity and operating speeds, it is desirable to efficiently monitor resource usage, identify performance issues, determine the root cause of the performance issues and provide appropriate remediation options. Continuous efforts are being made to better manage networked storage environments.

SUMMARY

In one aspect, a machine implemented method is provided. The method includes tracking performance of a plurality of resources used for reading and writing information at storage devices in a networked storage system, each resource represented by a logical object in a hierarchical structure and performance data associated with each logical object is maintained by a processor executing a management application out of a memory device; identifying a root object associated with a resource having a performance issue as indicated by a threshold violation for the resource; selecting a related object associated with a resource similar to the resource of the root object by the management application for comparing performance data of the root object with the related object; and using the comparison to verify that the root object is a root cause of the performance issue.

In another aspect, a non-transitory, machine readable storage medium having stored thereon instructions for performing a method, comprising machine executable code which when executed by at least one machine, causes the machine to: track performance of a plurality of resources used for reading and writing information at storage devices in a networked storage system, each resource represented by a logical object in a hierarchical structure and performance data associated with each logical object is maintained by a processor executing a management application out of a memory device; identify a root object associated with a resource having a performance issue as indicated by a threshold violation for the resource; select a related object associated with a resource similar to the resource of the root object by the management application for comparing performance data of the root object with the related object; and use the comparison to verify that the root object is a root cause of the performance issue.

In yet another aspect, a system having a memory with machine readable medium comprising machine executable code having stored thereon instructions is provided. A processor module coupled to the memory executes the machine executable code to: track performance of a plurality of resources used for reading and writing information at storage devices in a networked storage system, each resource represented by a logical object in a hierarchical structure and performance data associated with each logical object is maintained by a processor executing a management application out of a memory device; identify a root object associated with a resource having a performance issue as indicated by a threshold violation for the resource; select a related object associated with a resource similar to the resource of the root object by the management application for comparing performance data of the root object with the related object; and use the comparison to verify that the root object is a root cause of the performance issue.

This brief summary has been provided so that the nature of this disclosure may be understood quickly. A more complete understanding of the disclosure can be obtained by reference to the following detailed description of the various thereof in connection with the attached drawings.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures:

FIG. 3C shows a data structure with examples of various relationships between the resource objects, according to one aspect of the present disclosure;

FIGS. 6B-6G shows various screen shots for managing resources in a clustered storage environment, according to one aspect of the present disclosure;

DETAILED DESCRIPTION

Figure 1:
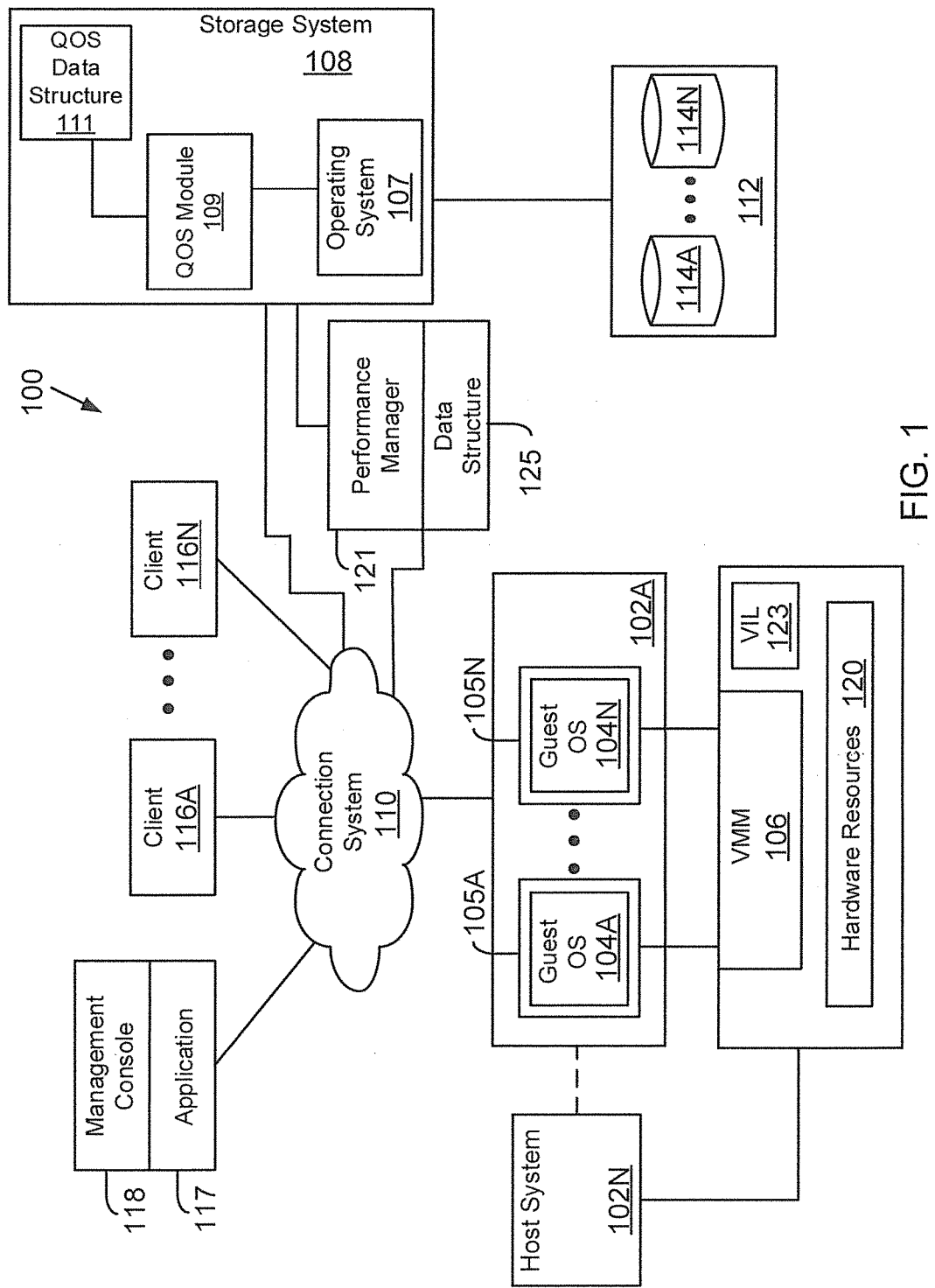
FIG. 1 shows an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, a performance manager module is provided that interfaces with a storage operating system to collect quality of service (QOS) data (or performance data) for various resources. QOS provides a certain throughput (i.e. amount of data that is transferred within a given time interval (for example, megabytes per seconds (MBS)), latency and/or a number of input/output operations that can be processed within a time interval, for example, in a second (referred to as IOPS). Latency means a delay in completing the processing of an I/O request and may be measured using different metrics for example, a response time in processing I/O requests.

As mentioned above, storage systems use various resources to process I/O requests for writing and reading data to and from storage devices. The storage system maintains various counters and data measurement objects (QOS data) for providing QOS to clients. The QOS data may include throughput data, a number of IOPS in a measurement period, and an average response time within the measurement period, a service time per visit to a resource, a wait time per visit to the resource and a number of visits at the resource used for processing I/O requests.

The performance manager uses historical QOS data obtained from the storage system to predict an expected range (or threshold value) for future QOS data. Future actual QOS data may be compared with the expected range to detect abnormal behavior. The abnormal behavior may be declared as an incident.

In one aspect of the present disclosure, methods and systems for managing resources in a storage system are provided. The methods include tracking performance of a plurality of resources used for reading and writing information at storage devices in a networked storage system, each resource represented by a logical object in a hierarchical structure and performance data associated with each logical object is maintained by a processor executing a management application (or performance manager) out of a memory device; identifying a root object associated with a resource having a performance issue as indicated by a threshold violation for the resource; selecting a related object associated with a resource similar to the resource of the root object via a graphical user interface (GUI) presented by the management application for comparing performance data of the root object with the related object; and using the comparison to verify that the root object is a root cause of the performance issue.

System 100:

FIG. 1 shows an example of a system 100, where the adaptive aspects disclosed herein may be implemented. System 100 includes a performance manager 121 that interfaces with a storage operating system 107 of a storage system 108 for receiving QOS data. The performance manager 121 may be a processor executable module that is executed by one or more processors out of a memory device.

The performance manager 121 obtains the QOS data and stores it at a local data structure 125. In one aspect, performance manager 121 analyzes the QOS data for detecting performance issues (that may be referred to as incidents) and identifying resources and storage volumes affected by performance issues. Details regarding the various operations performed by the performance manager 121 are provided below.

In one aspect, storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs)

including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines (VMs) 105A-105N). A storage volume is a logical storage object and typically includes a file system in a NAS environment or a logical unit number (LUN) in a SAN environment. The various aspects described herein are not limited to any specific format in which physical storage is presented as logical storage (volume, LUNs and others)

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit. The QOS policy information may be stored at a QOS data structure 111 maintained by a QOS module 109. QOS at the storage system level may be implemented by the QOS module 109. QOS module 109 maintains various QOS data types that are monitored and analyzed by the performance manager 121, as described below in detail.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 executing via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102A includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102 with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1 may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels, where a client with a higher service level may be provided with more storage space than a client with a lower service level. A client at a higher level may also be provided with a certain QOS vis-à-vis a client at a lower level.

Figure 2A:
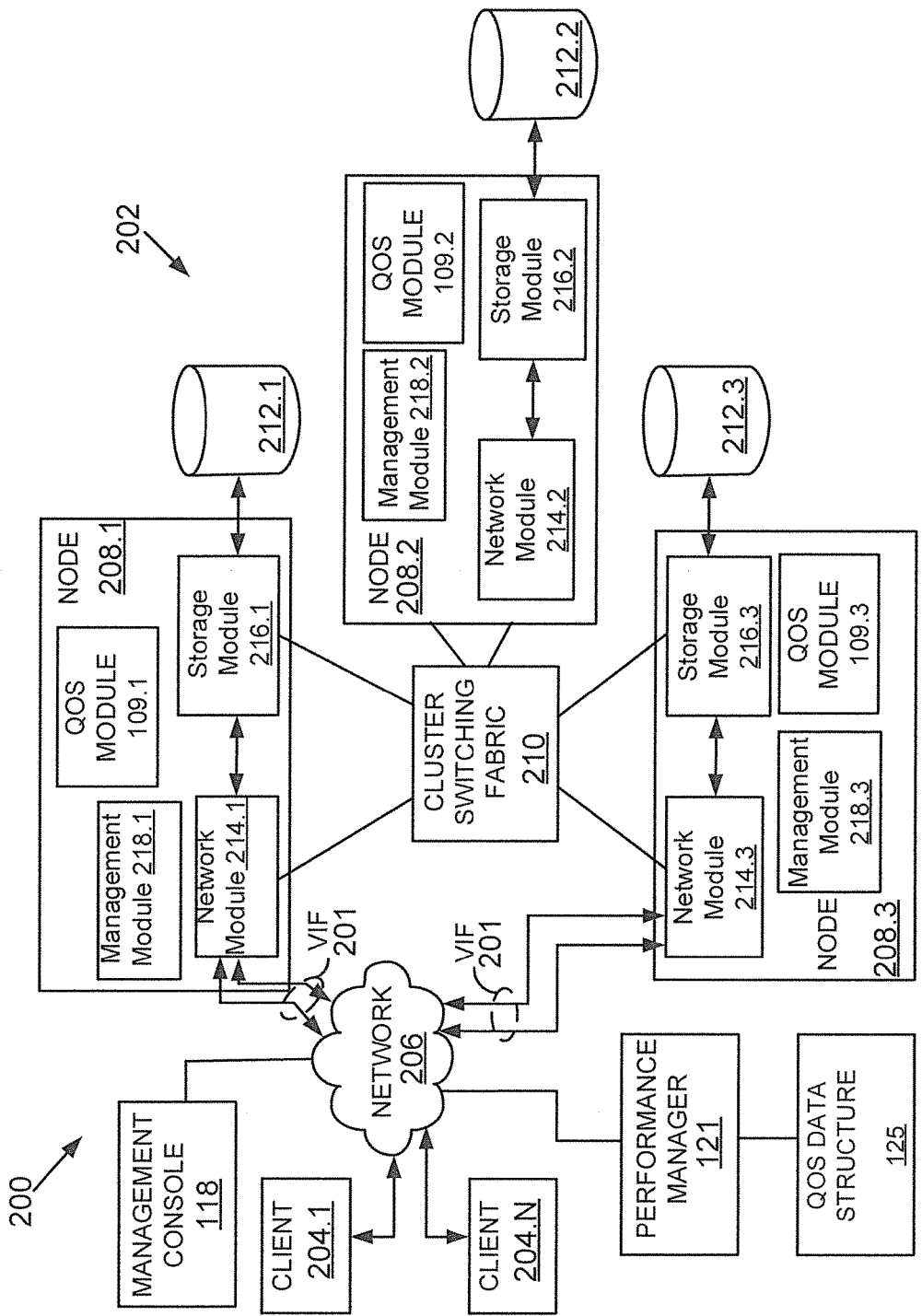
FIG. 2A shows an example of a clustered storage system, used according to one aspect of the present disclosure.

Although storage system 108 is shown as a stand-alone system, i.e. a non-cluster based system, in another aspect, storage system 108 may have a distributed architecture; for example, a cluster based system of FIG. 2A. Before describing the various aspects of the performance manager 121, the following provides a description of a cluster based storage system.

Clustered Storage System:

FIG. 2A shows a cluster based storage environment 200 having a plurality of nodes for managing storage devices, according to one aspect. Storage environment 200 may include a plurality of client systems 204.1-204.N (similar to clients 116A-116N, FIG. 1), a clustered storage system 202, performance manager 121, management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114).

Each of the plurality of nodes 208.1-208.3 is configured to include a network module (maybe referred to as N-module), a storage module (maybe referred to as D-module), and a management module (maybe referred to as M-Module), each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N over the computer network 206, while the storage modules 216.1-216.3 connect to one or more of the storage devices 212.1-212.3. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212.

Each node may execute or interface with a QOS module, shown as 109.1-109.3 that is similar to the QOS module 109. The QOS module 109 may be executed for each node or a single QOS module may be used for the entire cluster. The aspects disclosed herein are not limited to the number of instances of QOS module 109 that may be used in a cluster. Details regarding QOS module 109 are provided below.

A switched virtualization layer including a plurality of virtual interfaces (VIFs) 201 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM has a client domain and a security domain that are separate from the client and security domains of other SVMs. Moreover, each SVM is associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Performance manager 121 interfaces with the various nodes and obtains QOS data for QOS data structure 125. Details regarding the various modules of performance manager are now described with respect to FIG. 2B.

Figure 2B:
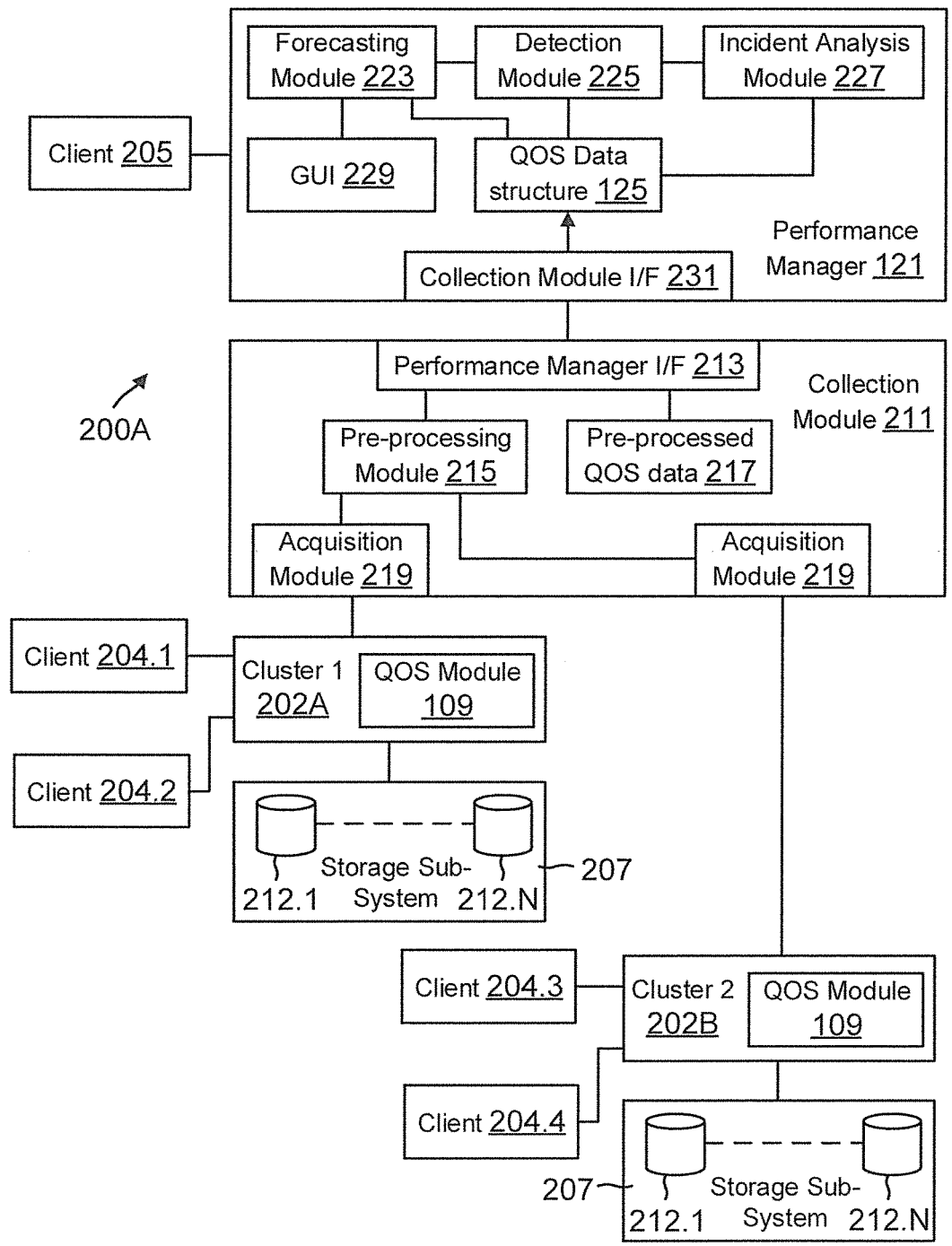
FIG. 2B shows an example of a performance manager for monitoring and analyzing QOS (quality of service) data, according to one aspect of the present disclosure.

Performance Manager 121:

FIG. 2B shows a block diagram of system 200A with details regarding performance manager 121 and a collection module 211, according to one aspect. Performance manager 121 uses the concept of workloads for tracking QOS data for incident detection, analysis and trouble shooting. At a high level, workloads are defined based on incoming I/O requests and use resources within storage system 202 for processing I/O requests. A workload may include a plurality of streams, where each stream includes one or more requests issued by clients. A stream may include requests from one or more clients. An example, of the workload model used by performance manager 121 is shown in FIG. 2F and described below in detail.

Performance manager 121 collects a certain minimal amount of data (for example, QOS data for 3 hours or 30 data samples) of workload activity. After collecting the minimal QOS data, performance manager 121 generates an expected range (or threshold values) for future QOS data.

The expected range is a range of measured performance activity (or QOS data) of a workload over a period of time. For example, a given twenty-four hour period may be split into multiple time intervals. The expected range may be generated for each time interval. The expected range sets a baseline for what may be perceived to be typical activity for the workload. The upper boundary of the expected range establishes a dynamic performance threshold that changes over time. For example, during 9.00 AM and 5.00 PM most employees of a business check their email between 9.00 AM-10.30 AM. The increased demand on email servers means an increase in the workload activity at the storage managed by the storage operating system. The demand on the storage may decrease during lunch time. The performance manager 121 tracks this activity to determine the expected range or expected QOS data behavior for future activity.

Performance manager 121 uses the expected range to represent and monitor I/O response time and operations for a storage volume in a cluster. The performance manager 121 tracks QOS data and in some cases identifies abnormal activity as incidents. An incident indicates that workload performance is outside a desirable level due to resource contention from other workloads i.e. workloads with higher usage of cluster resources may be causing the response time to increase. Incidents are considered as events that indicate I/O performance issues at a storage volume caused by resource contention.

Performance manager 121 compares historical QOS data with current QOS data to identify a victim workload whose performance may have decreased. Victim workloads may be identified based on response time deviation from an expected response time, as described below. After identifying the victim, the performance manager 121 identifies the resource that may be in contention as well as the workloads (or volumes) that may be overusing the resources (i.e. bully workloads).

Workloads are ranked to determine which bullies have the highest change in usage of the resource and which victims are most impacted. Based on the identification of victim and bully workloads, a remediation plan may be recommended to correct the problems associated with the incident.

Referring now to FIG. 2B, System 200A shows two clusters 202A and 202B, both similar to cluster 202 described above. Each cluster includes the QOS module 109 for implementing QOS policies that are established for different clients/applications.

Cluster 1 202A may be accessible to clients 204.1 and 204.2, while cluster 2 202B is accessible to clients 204.3/204.4. Both clusters have access to storage subsystems 207 and storage devices 212.1/212.N.

Clusters 202A and 202B communicate with a collection module 211. The collection module 211 may be a standalone computing device or integrated with performance manager 121. The aspects described herein are not limited to any particular configuration of collection module 211 and performance manager 121.

Collection module 211 includes one or more acquisition modules 219 for collecting QOS data from the clusters. The data is pre-processed by the pre-processing module 215 and stored as pre-processed QOS data 217 at a storage device (not shown). Pre-processing module 215 formats the collected QOS data for the performance manager 121. Pre-processed QOS data 217 is provided to a collection module interface 231 of the performance manager 121. QOS data received from collection module 211 is stored as QOS data structure 125 by performance manager 121 at a storage device (not shown).

Performance manager 121 includes a plurality of modules, for example, a forecasting module 223, a detection module 225 and an incident analysis module 227 that use the QOS data 125 for detecting incidents and reporting the incidents to a client system 205 via a GUI 229. Performance manager 121 also recommends a corrective action plan to client 205.

Client 205 may access the analysis results and recommendations using GUI 229. Details regarding the GUI module 229 are provided below. Before describing the various processes involving performance manager 121 and its components, the following describes using the performance manager 121 in a cloud based computing environment.

Figure 2C:
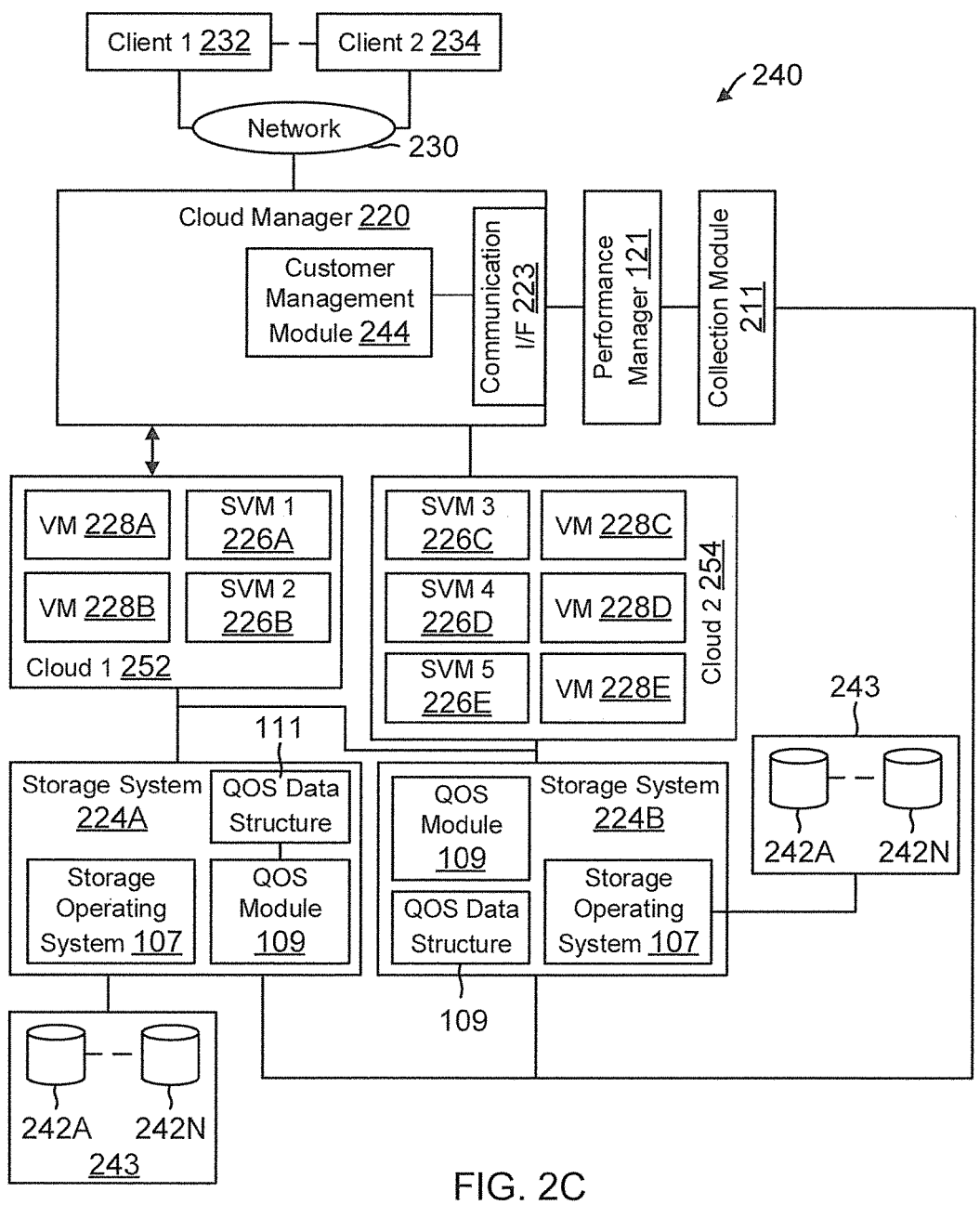
FIG. 2C shows an example of using the performance manager in a cloud computing environment, according to one aspect of the present disclosure.

Cloud Computing Environment:

FIG. 2C shows one or more storage system (or controllers) 224A/224B analogous to storage system 108/202 in a cloud computing environment 240, according to one or more aspects. In one or more aspects, cloud computing environment 240 may be a computing environment configured to enable network access (e.g., on-demand) to a shared pool of configurable computing resources (e.g., networks, storage, host servers, applications, services). In one or more aspects, a storage system may be a hardware resource configured to host one or more SVMs in cloud computing environment 240.

Storage system 224A and storage system 224B may be deployed by a cloud manager 220 and/or a cloud administrator configured to provision the host systems, storage associated with one or more client devices (e.g., client 1 232, client 2 234) and/or services requested by the one or more client devices. As an example, storage system 224A may be configured to be associated with SVM 1 226A and SVM 3 2260. Storage system 224B may be configured to be associated with SVM 2 226B, SVM 4 226D and SVM 5 226E.

In one or more aspects, cloud manager 220 may enable one or more client devices to self-provision computing resources thereof. As an example, cloud manager 220 may manage cloud portion(s) (e.g., cloud 1 252, cloud 2 254) associated with client 1 232 and client 2 234. Client 1 232 and/or client 2 234 may log into a console associated with cloud manager 220 to access cloud 1 252 and/or cloud 2 254 (and the VMs 228A-228E therein) through a public network 230 (e.g., Internet). The client devices and/or VMs associated therewith provided in cloud computing environment 240 may be analogous to the clients of FIGS. 1/2A.

In order to address storage requirements/requests associated with client 1 232 and client 2 234, cloud manager 220 may be configured to appropriately provision SVM 1 226A, SVM 2 226B, SVM 3 2260, SVM 4 226D and SVM 5 226E and allocate to client 1 232 and client 2 234. The aforementioned SVMs may be virtualized entities utilized by client 1 232 and client 2 234 to meet storage requirements thereof. Multi-tenancy may allow for a storage system to have multiple SVMs associated therewith. A portion of the cloud (e.g., cloud 1 252) including SVM 1 226A, SVM 2 226B and VMs (e.g. VM 228A, VM 228B) associated therewith may be associated with client 1 232 and a portion of the cloud (e.g., cloud 2 254) including SVM 3 226C, SVM 4 226D and SVM 5 226E and VMs (e.g., VM 228C, VM 228D, VM 228E) associated therewith may be associated with client 2 234. In one or more aspects, VMs may reside on storage exposed by SVM(s).

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232 and/or client 2 234 may be entities (e.g., corporations, departments and others), and that there may be a number of computing devices associated with each of client 1 232 and/or client 2 234.

Cloud 1 252 and/or cloud 2 254 may span across several geographic regions. In one or more aspects, the aforementioned cloud portions may span multiple countries under differing jurisdictional guidelines. For example, a jurisdictional guideline may deem that a SVM needs to be launched on hardware (e.g., storage system) located in the same jurisdiction as the corresponding client(s).

In one or more aspects, administrators of cloud computing environment 240 may possess the authority to launch one or more SVMs on any of storage system 224A and storage system 224B, irrespective of the location(s) thereof. Further, in one or more aspects, the aforementioned one or more SVMs may be associated with one or more versions of storage operating system 107. For example, an administrator may modify the version of the storage operating system and/or configuration settings on storage system 224A and/or storage system 224B.

In one aspect, cloud computing environment 240 includes the performance manager 121 and the collection module 211 that have been described above. The various processes executed by the performance manager 121 and the collection module 211 are described below.

Figure 2D:
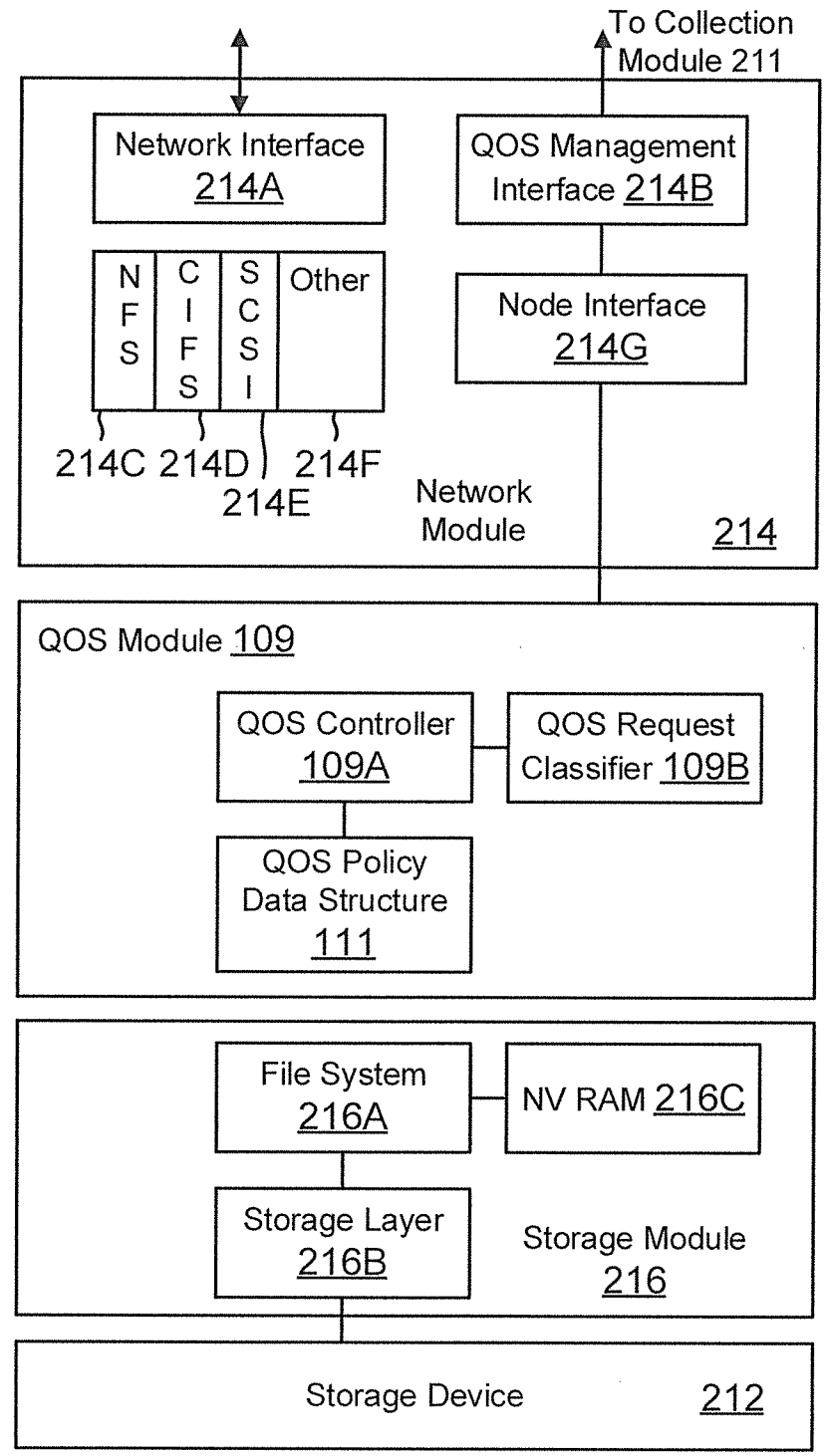
FIG. 2D shows an example of handling QOS requests by a storage system, according to one aspect of the present disclosure.

Before describing the various processes executed by the performance manager 121, the following describes how QOS requests are handled at the cluster level with respect to FIG. 2D.

QOS Overview:

As shown in FIG. 2D, the network module 214 of a cluster includes a network interface 214A for receiving requests from clients. Network module 214 executes a NFS module 214C for handling NFS requests, a CIFS module 214D for handling CIFS requests, a SCSI module for handling iSCSI requests and an others module 214F for handling "other" requests. A node interface 214G is used to communicate with QOS module 109, storage module 216 and/or another network module 214. QOS management interface 214B is used to provide QOS data from the cluster to collection module 211 for pre-processing data.

QOS module 109 includes a QOS controller 109A, a QOS request classifier 109B and QOS policy data structure (or Policy_Group) 111. The QOS policy data structure 111 stores policy level details for implementing QOS for clients and storage volumes. The policy determines what latency and throughput rate is permitted for a client as well as for specific storage volumes. The policy determines how I/O requests are processed for different volumes and clients.

The storage module 216 executes a file system 216A (a part of storage operating system 107 described below) and includes a storage layer 216B to interface with storage device 212. NVRAM 216C of the storage module 216 may be used as cache for responding to I/O requests.

A request arrives at network module 214 from a client or from an internal process directly to file system 216A. Internal process in this context may include a de-duplication module, a replication engine module or any other entity that needs to perform a read and/or write operation at the storage device 212. The request is sent to the QOS request classifier 109B to associate the request with a particular workload. The classifier 109B evaluates a request's attributes and looks for matches within QOS policy data structure 111. The request is assigned to a particular workload, when there is a match. If there is no match, then a default workload may be assigned.

Once the request is classified for a workload, then the request processing can be controlled. QOS controller 109A determines if a rate limit (i.e. a throughput rate) for the request has been reached. If yes, then the request is queued for later processing. If not, then the request is sent to file system 216A for further processing with a completion deadline. The completion deadline is tagged with a message for the request.

File system 216A determines how queued requests should be processed based on completion deadlines. The last stage of QOS control for processing the request occurs at the physical storage device level. This could be based on latency with respect to storage device 212 or for NVRAM 216C that may be used for any logged operation.

Figure 2E:
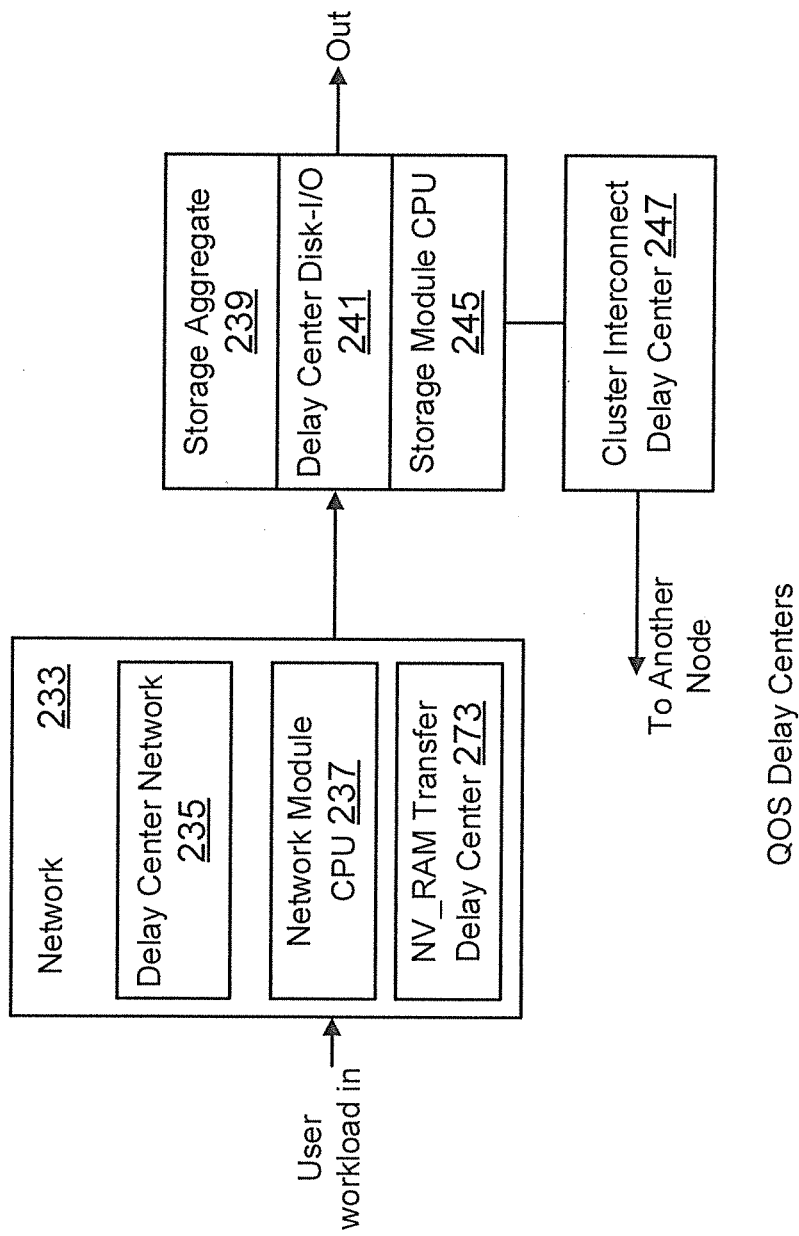
FIG. 2E shows an example of a resource layout used by the performance manager, according to one aspect of the present disclosure.
Figure 2F:
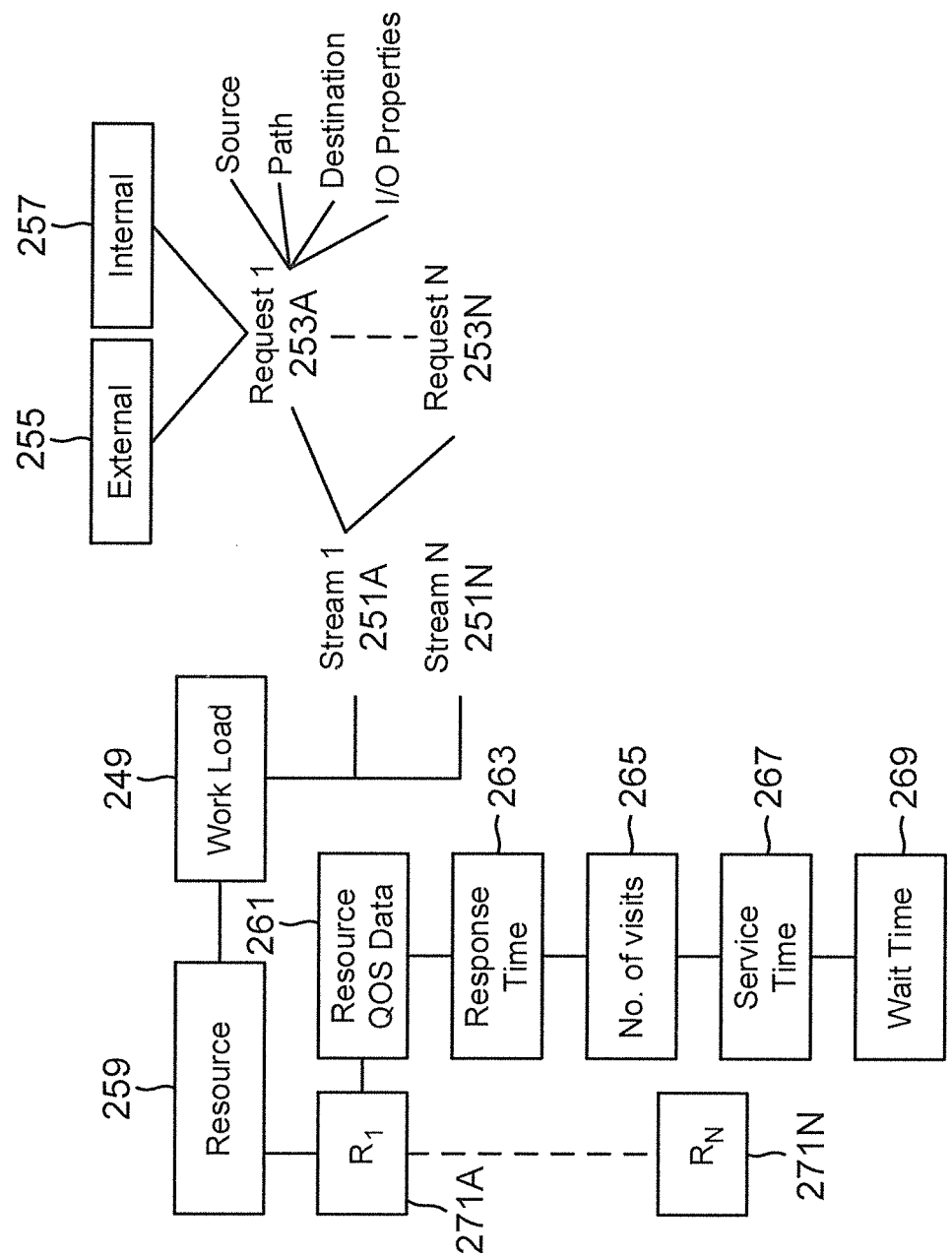
FIG. 2F shows an example of managing workloads and resources by the performance manager, according to one aspect of the present disclosure.

Performance Model:

FIG. 2E shows an example of a queuing network used by the performance manager 121 for detecting and trouble shooting performance issues, according to one aspect. A user workload enters the queuing network from one end (i.e. at 233) and leaves at the other end.

Various resources are used to process I/O requests. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, the QOS data includes a number of visits, wait time per visit and service time per visit for incident detection and analysis. For the delay center, only the number of visits and the wait time per visit at the delay center are used, as described below in detail.

Performance manager 121 uses different flow types for incident detection and analysis. A flow type is a logical view for modeling request processing from a particular viewpoint. The flow types include two categories, latency and utilization. A latency flow type is used for analyzing how long operations take at the service and delay centers. The latency flow type is used to identify a victim workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention and a bully workload as described below in detail.

Referring now to FIG. 2E, delay center network 235 is a resource queue that is used to track wait time due to external networks. Storage operating system 107 often makes calls to external entities to wait on something before a request can proceed. Delay center 235 tracks this wait time.

Network module CPU 237 is another resource queue where I/O requests wait for protocol processing by a network module processor. A separate queue for each node may be maintained.

NV_RAM transfer delay center 273 is used to track latency due bandwidth/capacity of non-volatile memory used by cluster nodes to store write data before, the data is written to storage devices 212.

A storage aggregate (or aggregate) 239 is a resource that may include more than one storage device for reading and writing information. Disk-I/O 241 queue may be used to track utilization of storage devices 212. A storage module CPU 245 represents a processor that is used to read and write data. The storage module CPU 245 is a service center and a queue is used to track the wait time for any writes to storage devices by a storage module processor.

Nodes within a cluster communicate with each other. These may cause delays in processing I/O requests. The cluster interconnect delay center 247 is used to track the wait time for transfers using the cluster interconnect system. As an example, a single queue maybe used to track delays due to cluster interconnects.

There may also be delay centers due to certain internal processes of storage operating system 107 and various queues may be used to track those delays. For example, a queue may be used to track the wait for I/O requests that may be blocked for file system reasons. Another queue (Delay_Center_Susp_CP) may be used to represent the wait time for Consistency Point (CP) related to the file system 216A. During a CP, write requests are written in bulk at storage devices and this will typically cause other write requests to be blocked so that certain buffers are cleared.

Without limiting the various aspects of the present disclosure, Table I below provides an example of the various service and delay centers that may be used by performance manager 121 to track workload performance using different resources. Some of these resources are shown in FIG. 2E. Table I also identifies the resource type (i.e. utilization and/or latency type).

TABLE I

| Resource Name | Resource Description | Type |
|---|---|---|
| CPU_N_Module (234, FIG. 2E) | This resource identifies a queue where I/O requests wait for file protocol processing at a network module (N-Module) 214. As an example, there may be one queue for each node. | Utilization, Latency |
| CPU_D_Module (245, FIG. 2E) | This resource identifies a queue where I/O requests wait for scheduling for being written to a storage device by the storage module (D-Module) 216. As an example, there may be one queue for each node. | Utilization, Latency |
| DISK_HDD_<Aggr_name> (241, FIG. 2E) | This resource represents non-solid state physical storage devices in an aggregate, for example, hard drives, tapes and others. This provides an average view across all storage devices within an aggregate. As an example, there may be one queue for each aggregate to track this resource. | Utilization |
| DISK_SSD_<aggr_name> (Similar to 241, FIG. 2E) | This resource is similar to 241, and represents physical solid state storage devices (SSDs) in an aggregate. This provides an average view across all storage devices within the aggregate. As an example, there may be one queue for each aggregate to track this resource. | Utilization |
| DELAY_CENTER_WAFL_SUSP_DISKIO | This is a queue to represent the wait time for blocked disk I/O related file system suspensions. | Latency |
| DELAY_CENTER_WAFL_SUSP_CP | This is a queue to represent wait time for Consistency Point (CP) related suspensions by the file system. A CP causes write requests to a block so that buffers can be cleared. | Latency |
| DELAY_CENTER_NETWORK (235, FIG. 2E) | This is a queue that represents an external network wait time. At times, storage operating system 107 calls out an external entry to wait on a task outside of the storage operating system to complete before the request can continue and this queue is used to track that wait time. There may be one delay center for an entire cluster. | Latency |
| DELAY_CENTER_CLUSTER_INTERCONNECT (247, FIG. 2E) | This queue is used to represents the wait time for transfers over a cluster interconnect. As an example, there may be one queue per cluster. | Latency |

TABLE I-continued

| Resource Name | Resource Description | Type |
|---|---|---|
| NV_RAM Transfer Delay Center (273, FIG. 2E) | This queue is used to represent write throughput at each node in a high-availability and metro-cluster configuration for disaster recovery. | Latency |

Workload Model:

FIG. 2F shows an example, of the workload model used by performance manager 121, according to one aspect. As an example, a workload may include a plurality of streams 251A-251N. Each stream may have a plurality of requests 253A-253N. The requests may be generated by any entity, for example, an external entity 255, like a client system and/or an internal entity 257, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol.

A destination is the target of a request, for example, storage volumes, LUNs, data containers and others.

I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload. Furthermore, requests that fall into a workload are tracked together by performance 121 for efficiency. Any requests that don't match a user or system defined workload may be assigned to a default workload.

In one aspect, workload streams may be defined based on the I/O attributes. The attributes may be defined by clients. Based on the stream definition, performance manager 121 tracks workloads, as described below.

Referring back to FIG. 2F, a workload uses one or more resources for processing I/O requests shown as 271A-271N as part of a resource object 259. The resources include service centers and delay centers that have been described above with respect to FIG. 2E and Table I. For each resource, a queue is maintained for tracking different statistics (or QOS data) 261. For example, a response time 263, and a number of visits 265, a service time (for service centers) 267 and a wait time 269 are tracked. The term QOS data as used throughout this specification includes one or more of 263, 265, 267 and 269 according to one aspect.

Without limiting the various aspects of the present disclosure, Table II below provides an example of a non-exhaustive listing of the various objects that are used by the performance manager 121 for incident detection and analysis, where each object may have multiple instances:

TABLE II

| Object | Instance | Purpose | Description |
|---|---|---|---|
| Workload | <workload_name> | Represents an external workload applied to a volume. The object may be used to measure workload performance against service levels. | Throughput, Average response time |
| Resource | <resource_name> | Provide hierarchical utilization of resources and may be a service or delay center. | Utilization |
| Resource_detail | <resource_name>. <workload_name> | Breakdowns resource usage by workload from a resource perspective. | Utilization |
| Workload_detail | <workload_name>. <service_center_name> | Breakdowns workload response time by resource. | Number of visits, service time per visit and wait time per visit |

Performance manager 121 also uses a plurality of counter objects for incident detection and analysis. Without limiting the adaptive aspects, an example of the various counter objects are shown and described in Table III below:

TABLE III

| Workload Object Counters | Description |
|---|---|
| OPS | A number of workload operations that are completed during a measurement interval, for example, a second. |
| Read_ops | A number of workload read operations that are completed during the measurement interval. |

TABLE III-continued

| Workload Object Counters | Description |
| --- | --- |
| Write_ops | A number of workload write operations that are completed during the measurement interval. |
| Total_data | Total data read and written per second by a workload. |
| Read_data | The data read per second by a workload. |
| Write_data | The data written per second by a workload. |
| Latency | The average response time for I/O requests that were initiated by a workload. |
| Read_latency | The average response time for read requests that were initiated by a workload. |
| Write_latency | The average response time for write requests that were initiated by a workload. |
| Latency_hist | A histogram of response times for requests that were initiated by a workload. |
| Read_latency_hist | A histogram of response times for read requests that were initiated by a workload. |
| Write_latency_hist | A histogram of response times for write requests that were initiated by a workload. |
| WID | A workload ID. |
| Classified | Requests that were classified as part of a workload. |
| Read_IO_type | The percentage of reads served from various components (for example, buffer cache, ext_cache or disk). |
| Concurrency | Average number of concurrent requests for a workload. |
| Interarrival_time_sum_squares | Sum of the squares of the Inter-arrival time for requests of a workload. |
| Policy_group_name | The name of a policy-group of a workload. |
| Policy_group_uuid | The UUID (unique indetifier) of the policy-group of a workload. |
| Data_object_type | The data object type on which a workload is defined, for example, one of SVM, volume, LUN, file or node. |
| Data_object_name | The name of the lowest-level data object, which is part of an instance name as discussed above. When data_object_type is a file, this will be the name of the file relative to its volume. |
| Data_object_uuid | The UUID (Unique Universal ID) of a SVM, volume or LUN on which this data object is defined. |
| Data_object_file_handle | The file handle of the file on which this data object is defined; or empty if data_object_type is not a file. |

Without limiting the various aspects of the present disclosure, Table IV below provides an example of the details associated with the object counters that are monitored by the performance manager 121 for detecting incidents, according to one aspect:

TABLE IV

| Workload Detail Object Counter | Description |
| --- | --- |
| Visits | A number of visits to a physical resource per second; this value is grouped by a service center. |
| Service_Time | A workload's average service time per visit to the service center. |
| Wait_Time | A workload's average wait time per visit to the service center. |

When a workload is responding slowly, a user may want to analyze the workload to determine the root cause of any issues and then perform corrective action to solve the issues. Performance manager 121 using QOS data collected from the different clusters and using the workload performance model detects such issues as incidents and then provides remedial actions.

Performance manager 121 uses collected QOS data to predict dynamic threshold values for workloads. Using the dynamic threshold values and statically defined threshold values, detection module 225 detects one or more incidents. The incident analysis module 227 then determines which resource may be in contention for a victim workload and identifies any bully workloads that may have caused the incident.

Figure 3A:
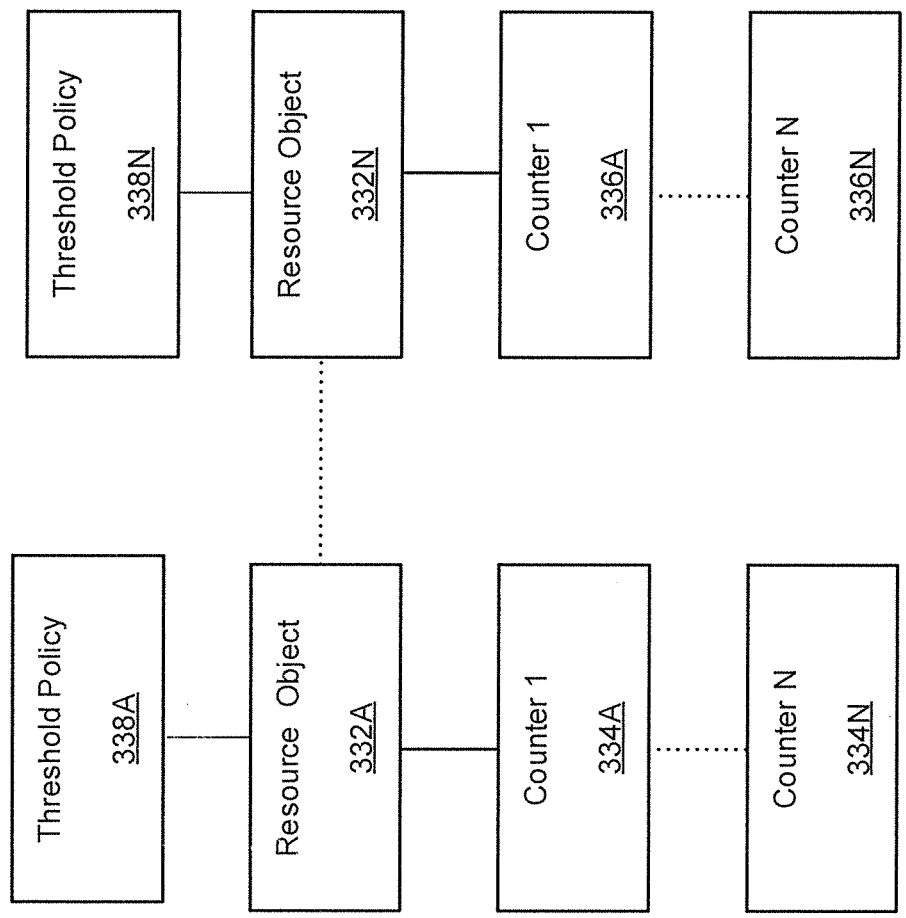
FIG. 3A shows a block diagram of using counters for tracking resources, according to one aspect of the present disclosure.

Object Layout:

FIG. 3A shows high-level block diagram with various resource objects 332A-332N that are maintained by performance manager 121. The resources may be physical or logical. Each resource object may have one or more counters 334A-334N and 336A-336N for collecting and maintaining performance data associated with the object, similar to the data described above. Each resource object may be associated with a threshold policy (or value) 338A-338N. The threshold values may be programmed or determined dynamically based on performance and utilization of a resource object. The threshold values are used to detect a potential performance issue and then report the same to a user. Examples of different resource objects are described below with respect to FIGS. 3B and 3C.

Figure 3B:
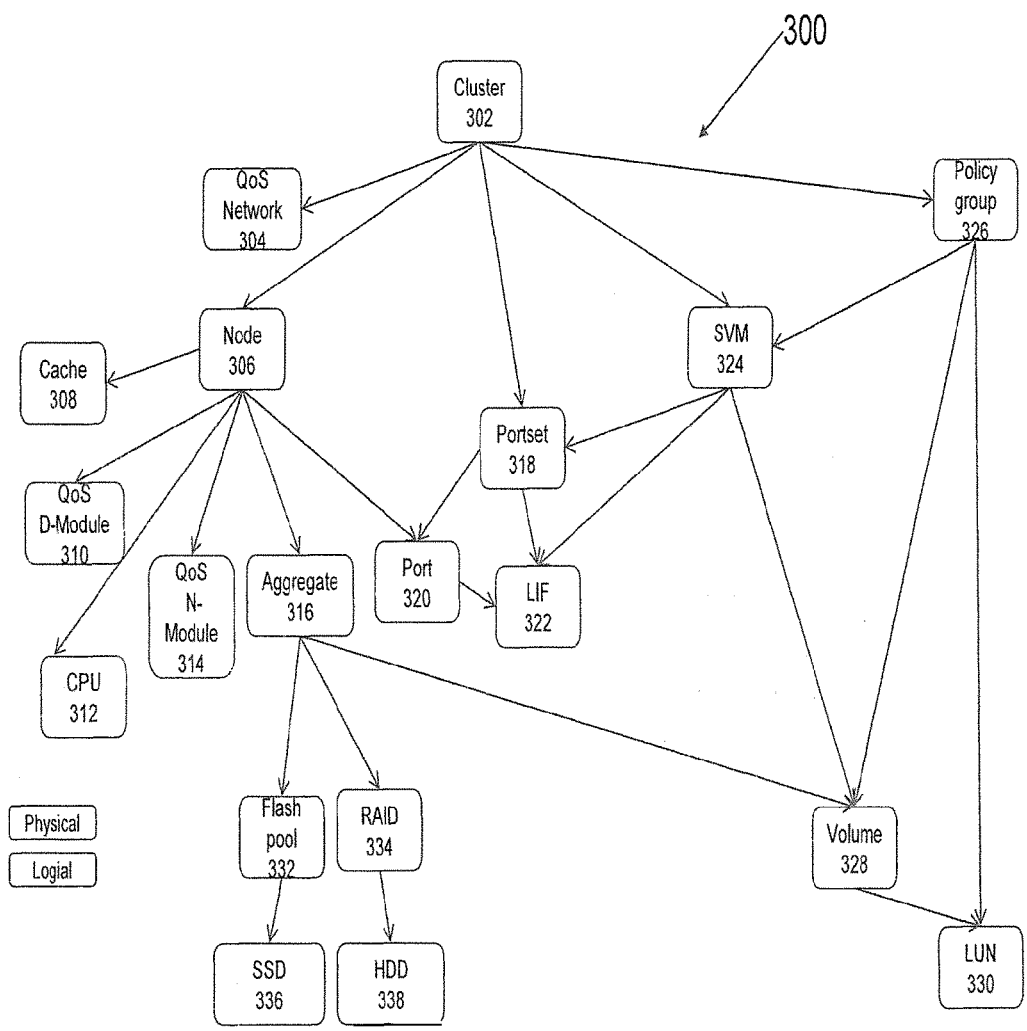
FIG. 3B shows a format for tracking various resource objects, according to one aspect of the present disclosure.

Object Hierarchy:

FIG. 3B shows a format 300 for tracking information regarding different resources that are used within a clustered storage system (for example, 200, FIG. 2A). Format 300 is hierarchical in nature where various objects may have parent-child, peer and remote peer relationships, as described below. As an example, format 300 shows a cluster object 302 that may be categorized as a root object type. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module, a CPU object 312 and an aggregate object 316. The cache object 308 is used to track utilization of a cache (for example, NVRAM 216C, FIG. 2D). The QOS storage module 310 tracks the QOS of a storage module defined by a QOS policy data structure 111 described above in detail with respect to FIG. 2D. The QOS network module object 314 tracks the QOS for a network module. The CPU object 312 is used to track CPU performance and utilization of a node.

The aggregate object 316 tracks the utilization of a storage aggregate that is managed by a cluster node. The aggregate object may have various child objects, for example, a flash pool object 332 that tracks usage of a plurality of flash based storage devices (shown as "flash pool"). The flash pool object 332 may have a SSD disk object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a LIF object 322. The LIF object 322 includes a logical interface, for example, an IP address, while the port object 320 includes a port identifier for a port, for example, a worldwide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (red, write or read and write) and other information.

FIG. 3C shows an example of different infrastructure object types (for example, cluster, 302, node 306, aggregate 316, port 320, SVM 324, volume 328, LUN 330, LIF 322) and their relationships with a parent object, peer object physical and logical child and the different workloads that are associated with the objects. The workload data includes the sum of network module and storage module utilization, an aggregate utilization, volume utilization and others are maintained using counters. The counters are updated based on policies that are defined by a user and stored as part of the policy group 326.

As an example, a cluster does not have any physical or logical parent since it is the first object in the hierarchy. Physical nodes are physical children of the cluster object, while SVMs are logical children.

FIG. 3C has a first column labelled as "root object type", a second column as "physical parent", a third column as "logical parent", a fourth column as "physical peer", a fifth column as "logical peer", a sixth column as "physical child", a seventh column as "logical child" and an eight column as "workloads". The ninth column is labelled as "HA Partner" which means a node configured as a partner node for failover.

Node object 306 has physical peers i.e. other nodes and physical children include aggregates on the same nodes as well as ports/network interface cards. The workloads for a node include the sum of network module and storage module utilization. Node 306 may also have another peer node configured as a HA partner.

Aggregate object 316 has a node as a physical parent and another aggregate as a physical peer. The volumes on the aggregate are logical children. The aggregate utilization is tracked by a counter maintained by the performance manger 121 based on data collected from the storage system.

Port object 320 has a node as a physical parent, while other ports in a same portset and on the same node are physical peers. The LIFs for the ports are logical children.

SVM 324 have other SVMs as logical peers and a cluster is a physical parent. Volumes and LIFs are logical children.

The relationships for volume 328, LUN 330 and LIF 322 objects are self-explanatory.

In one aspect, a GUI based tool is provided for evaluating resource performance and utilization. The GUI based tool (shown as "performance explorer" below) provides a grid where a user is able to view a root object that may be a root cause of a performance issue. The user is also able to select a category of objects and objects within the category for comparison with the root object to validate the performance issues associated with the root object before taking any remedial action.

It is noteworthy that although the examples shown herein are with respect to the GUI based tool, but the functionality as captured by the various process flows may be implemented using one or more hardware processor executable application programming interface (APIs).

Figure 4A:
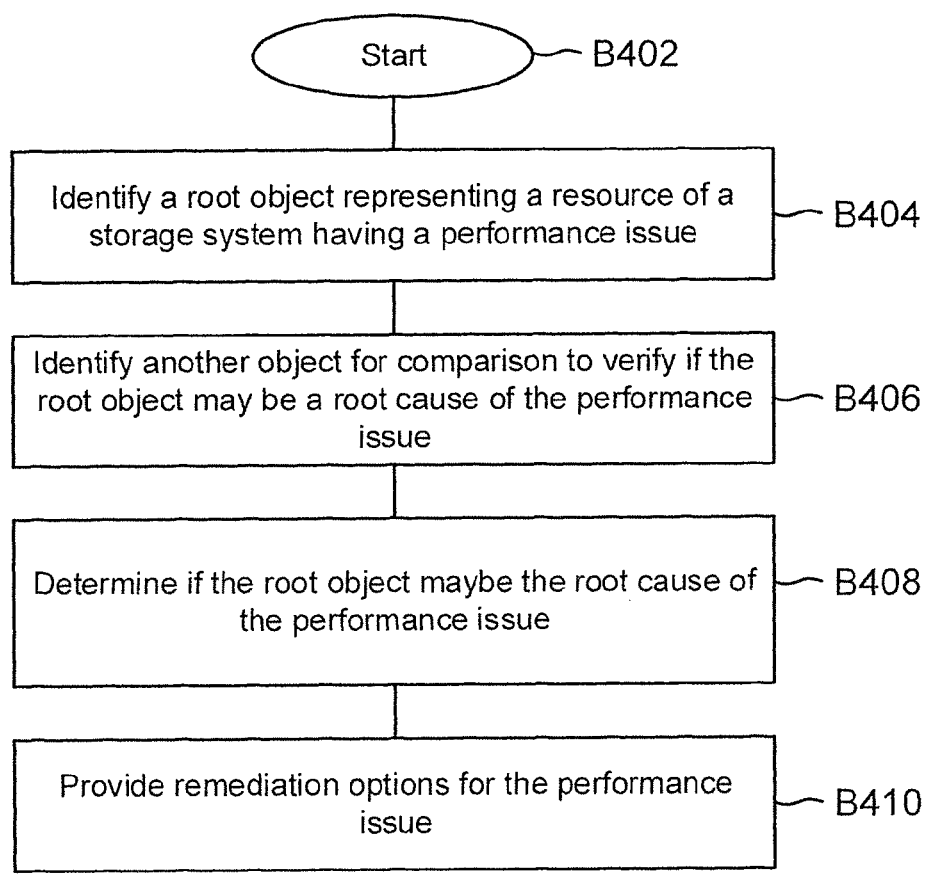
FIGS. 4A and 4B show examples of process flows for trouble shooting performance issues associated with an object, according to one aspect of the present disclosure.

Process Flow:

FIG. 4A shows a process flow 400, according to one aspect. The process starts in block B402, when performance manager 121, host systems 102 and the clustered storage system nodes are operational. Data is collected periodically for various resources and tracked using a plurality of counters. Examples of various resource objects used for tracking resource performance are shown in FIG. 3B and described above.

The performance manager 121 monitors the performance of various resources using the plurality of counters. Different metrics, for example, latency, IOPS, throughput, utilization and others are monitored. The performance manager 121 compares the resource performance with threshold values that are associated with individual resource. The monitoring may highlight resources that may be affected by performance issues (i.e. undesirable latency, utilization and others). If a threshold value is reached and the violation continues for a certain duration, an incident or an event is generated for the user.

In block B404, a root object representing the resource is identified. The object may be identified based on when the performance of the resource has reached a threshold value. The threshold value may be based on latency and/or utilization of the resource by one or more workloads.

In block B406, first a category of other objects is identified and then one or more of the other objects are selected for comparison with the root object. The other object (also referred to as candidate object) selection is based on the type of performance issue as well as the type of root object. The category of objects (or object type) is based on relevance to the root object type and the relationships that the objects have, described above with respect to FIGS. 3B and 3C.

As an example, the category of objects may be based on a child-parent relationship (for example, if an aggregate is having performance issues then a volume that is a child object may be selected for comparison); objects may of the same type as the root object (may be referred to as "sibling objects" or "peer" objects; for example, peer volumes within a same aggregate may be peer volumes that are selected); and objects of the same root object type but on a different high availability cluster node (may be referred to as a "node peer" object and may be selected for comparison). Other remotely related but possibly relevant objects may be selected as well. These may include QOS workloads that use the object, LIFs, policy objects, and others.

In block B408, the performance manager 121 compares the performance of the other object with the root object to determine if the root object is the root cause of the performance issue highlighted in block B402. The comparison is based on evaluating the performance of the other object and comparing that performance with the performance of root object. The comparison may be to determine when there were no issues with either objects; determine if there has been a configuration change over time that may have causes the root object to behave differently; and if a similar issue had been determined in the past with the root object and/or the other object.

The comparison provides the user with a baseline to verify if the root object is the root cause of the performance issue. If the root object is the root cause and depending on the type of performance issue, a remediation option is provided in block B410.

Figure 4B:
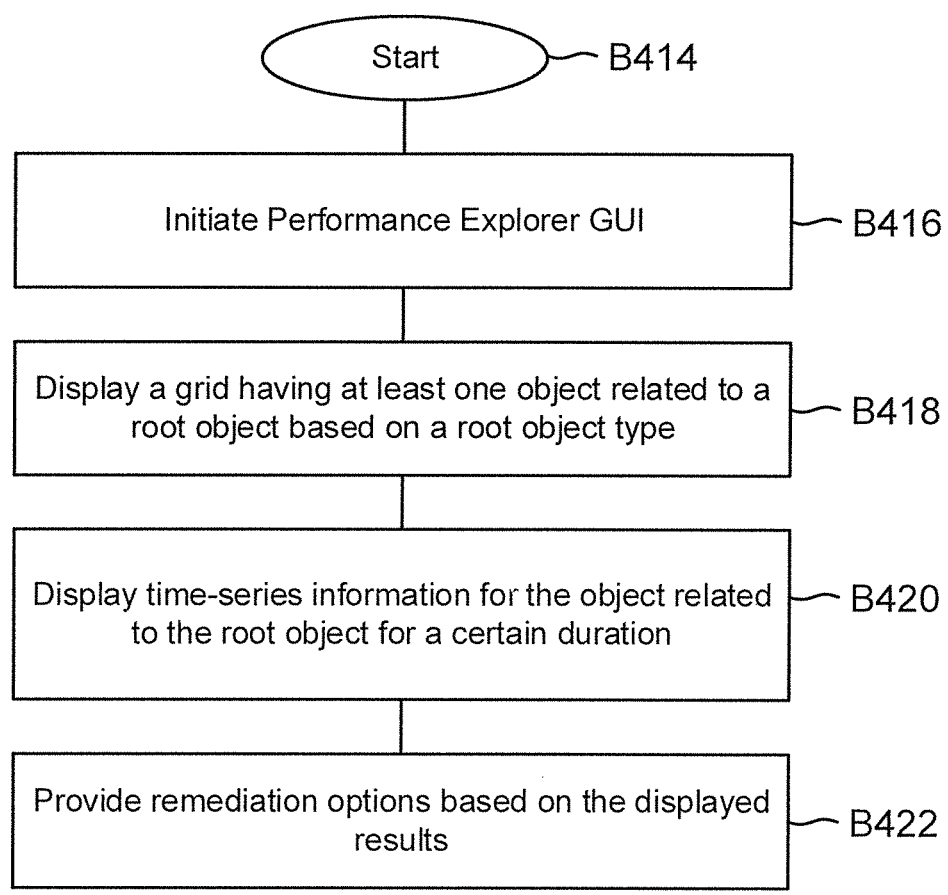

FIG. 4B provides a process 412 for using the performance explorer, according to one aspect of the present disclosure. The process starts in block B414 after the performance manager 121 monitors the various resources and an event/incident with respect to a resource has been identified.

Figure 5:
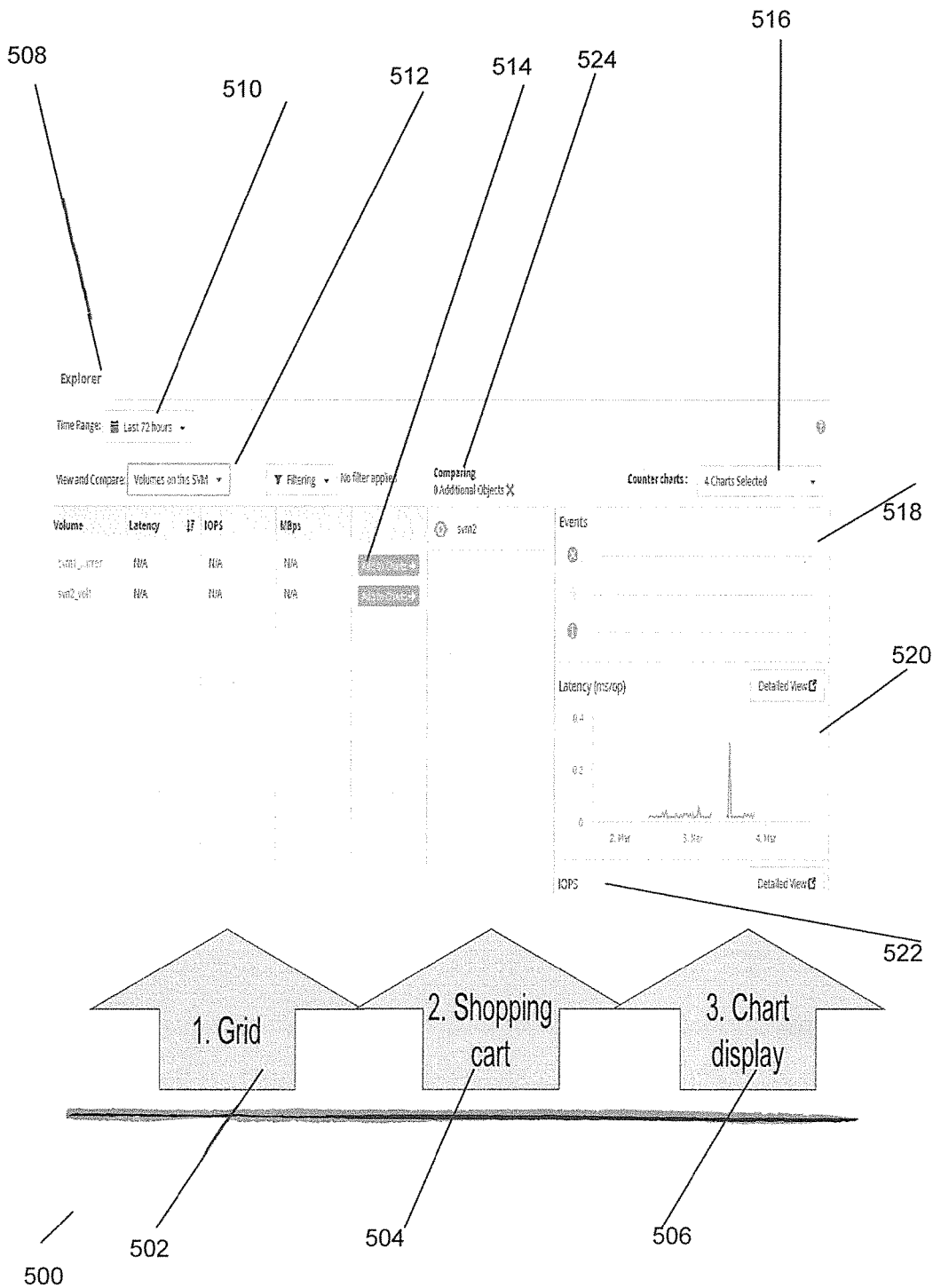
FIG. 5 shows an example of a screen shot for trouble shooting performance related issues, according to one aspect of the present disclosure.

In block B416, a performance explorer GUI 500 is presented on a display device of a computer. An example of the performance explorer GUI 500 is shown in FIG. 5 as tab 508. In one aspect, the performance explorer GUI is presented after an event is detected; from a dashboard of the performance manager 121 GUI; by doing a search for a resource object; from a URL that is mailed to a user with an incident report or from any other entry point.

In block B418, a grid is presented in the performance explorer GUI 500 with at least one object that is related to the root object. As described above, the related object is based on the root object type and the performance issue that may be highlighted. For example, in FIG. 5, the grid 502 shows various objects under the column labelled volume. The time range for data comparison is shown as 72 hours under tab 510. Tab 512 snows that volumes of a particular SVM are being listed in the grid region. In one aspect, grid values change, when the time period (shown as time range 510, FIG. 5) is changed. This displays average behavior over a different duration for identifying candidate objects that may have similar symptoms or may be the root cause of a problem.

In block B420, an object is selected for comparison. For example, the first entry for volume labelled as "svm1_imror" may be selected. Tab 514 may be used to select the object. As an example, the object is added to a shopping cart 504. In one aspect, a plurality of objects maybe placed in the shopping cart 504. The performance explorer GUI 500 enables hiding some of the objects without removing them. This enables the user to hide possible candidate objects but not discard them if the user is uncertain and wants to use them at a later time.

The shopping cart 504 shows a comparing segment 524. The comparing segment shows a SVM labelled as svm2. By using tabs 514, volumes svm1 and svn2 may be selected for comparison. One of the volumes may be the root object, while the other volume may be the related object. A time-series performance chart is then displayed in the chart display segment 506. The chart display segment shows the numbers of charts that are selected at any given time (516). The events are shown in segment 518. The latency graphs for the volume are shown as 520 and the IOPS are provided in segment 522.

Based on the comparison, the user can verify if the root object is the root cause of the performance issue. Thereafter, a remediation plan is presented to the user in block B422. The remediation may be based on the performance issue that is highlighted by the performance explorer. For example, the remediation may be to move a workload from one resource to another; change a policy setting or a threshold value; put a limit on a workload; upgrade equipment or any other action.

In one aspect, an intuitive GUI is provided for root cause investigation and analysis. The performance manager 121 provides a tool for the user to take action only after the root cause of the performance issue has been verified.

Figure 6A:
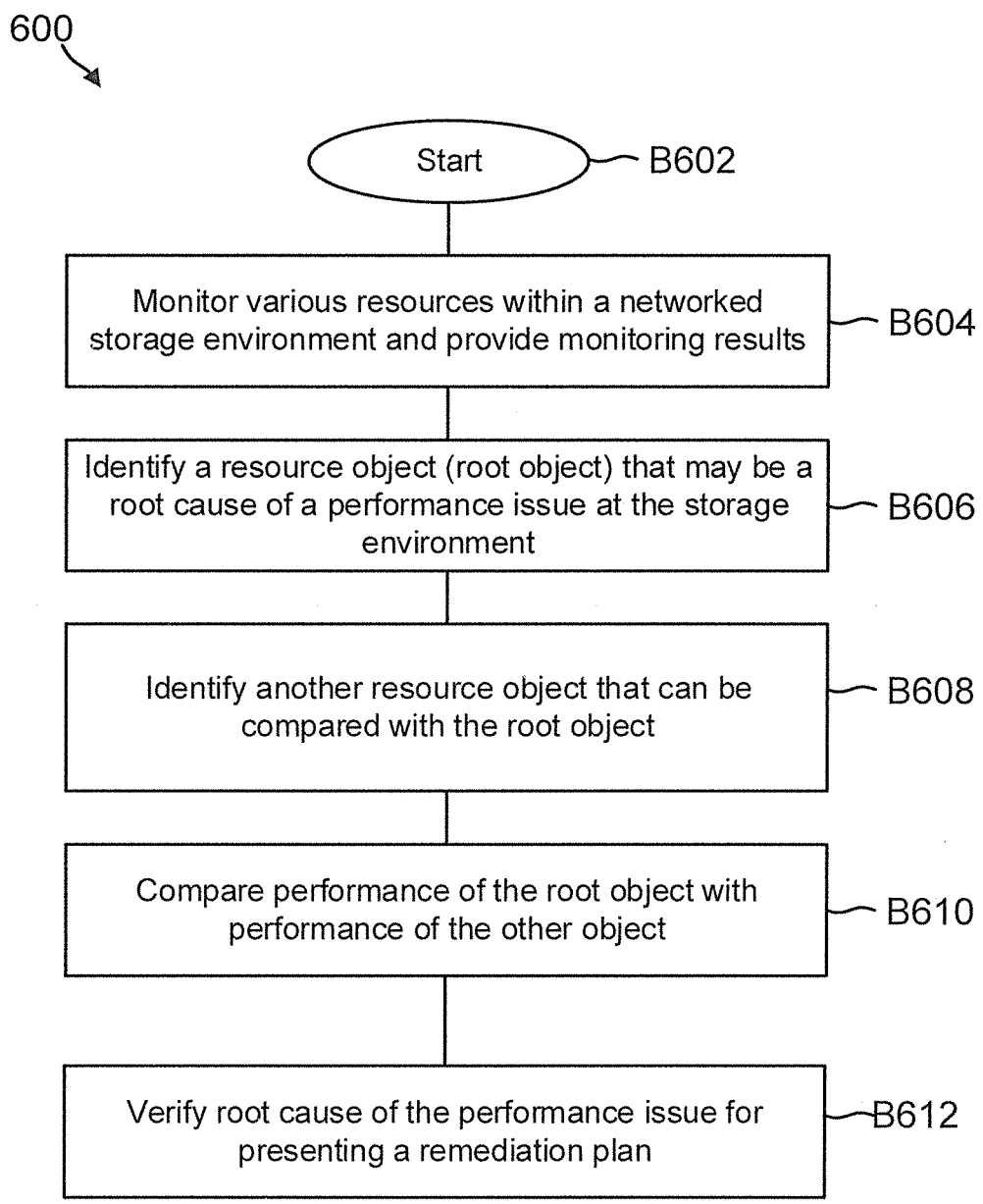
FIG. 6A shows another process flow diagram for monitoring resources of a clustered storage system and trouble shooting performance issues, according to one aspect of the present disclosure.
Figure 6B:
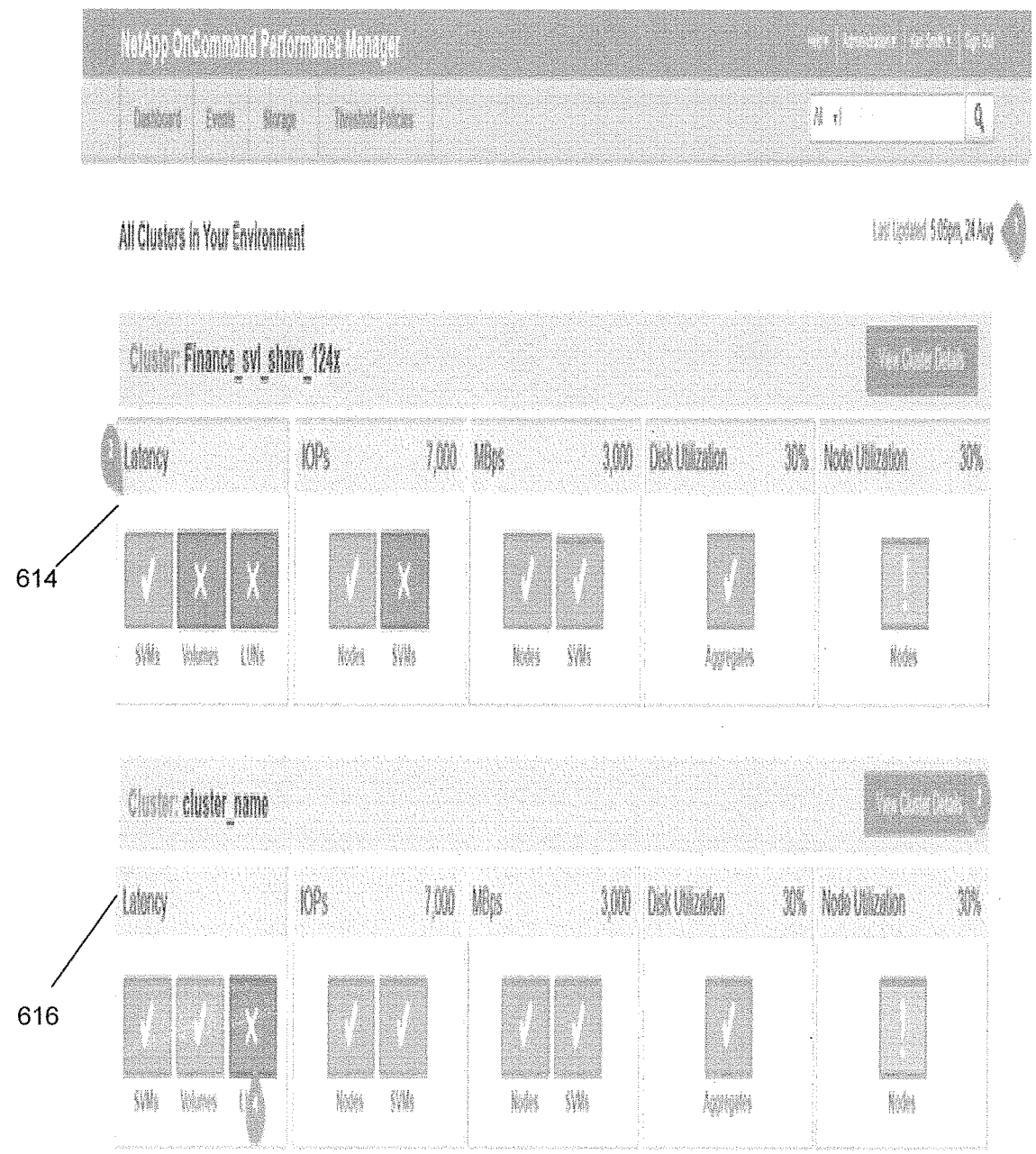

FIG. 6A shows a process 600 for monitoring and troubleshooting performance related events/incidents, according to one aspect. The various process blocks are explained below with respect to the screen shots of FIG. 6B-6G that are generated based on the various counters/data structures that are maintained at a memory storage device and have been described above in detail.

The process begins on block B602, when the various resources within a cluster or more than one cluster are operational. The different resources are managed as logical objects and performance data associated with the counters are obtained by the performance manager 121 and stored at one or more data structures, as described above.

In block 604, the various resources are monitored. In block B606, an event or an incident associated with a cluster is identified. An event or incident may be highlighted if a threshold value for a resource has been reached.

In one aspect, as an example, a storage administrator is provided with a high level view of different clusters that the administrator may be managing. This is shown as segments 614 and 616 at the screen shot of FIG. 6B. Segments 614/616 show latency indicator for the SVMs, volumes and LUNs. The number of IOPS for the various cluster nodes and SVMs, the throughput rate for the nodes and the SVMs, the disk utilization for the cluster aggregates and the node utilization.

Figure 6C:
Figure 6D:
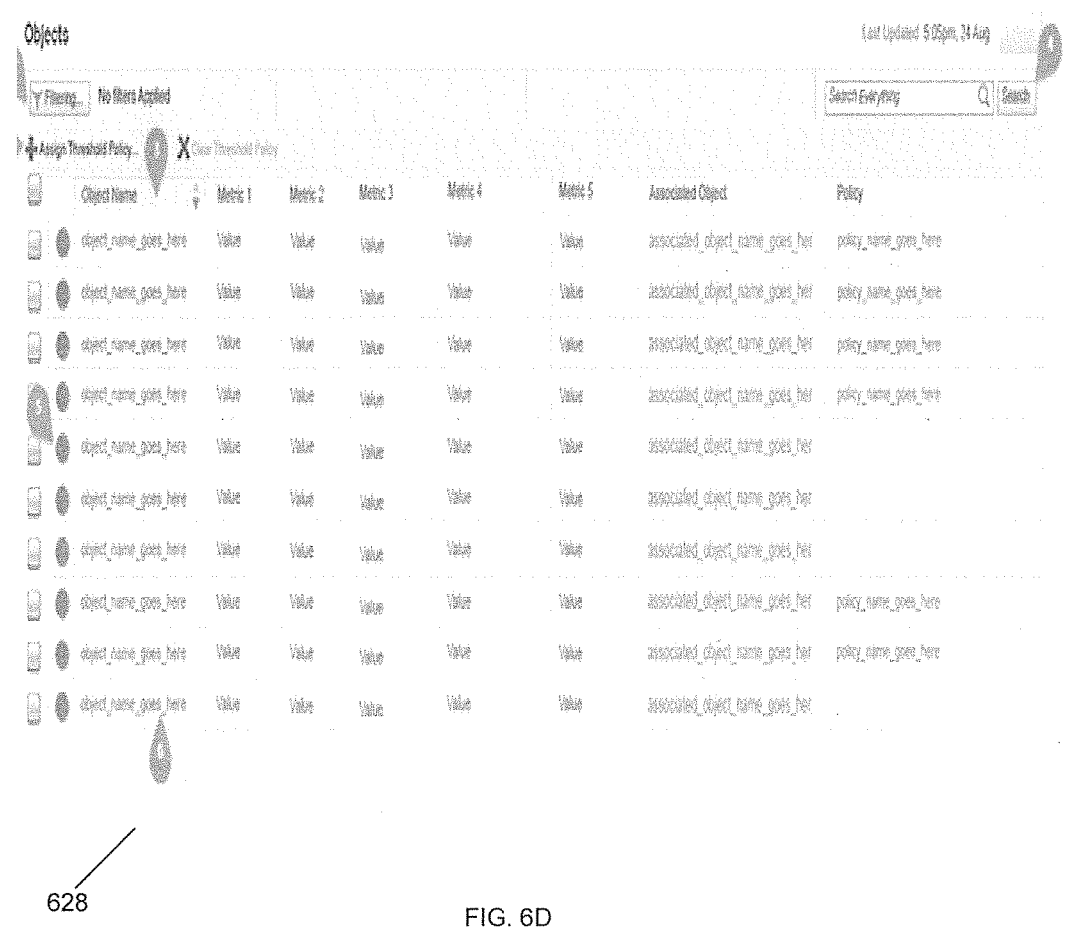

Since each cluster is an independent entity, the administrator is also provided with an overview of each cluster, as shown in FIG. 6C. The top portion of the screenshot of FIG. 6C, labelled as 618 includes all the active events of cluster. Segment 618, as an example, shows that there are 25 active events. A graph illustrates five different cluster parameters, latency, IOPS, throughput, node utilization and disk utilization. Individual charts for IOPs and throughput are shown in segment 618.

Below segment 618 is segment 622 that is viewed by selecting the overview option 620. Segment 622 shows a listing of various managed objects, for example, nodes, SVMs, aggregates, volumes, LUNs, LIFs and ports that have been described above with respect to various figures, includes FIG. 3B/3C. The cluster level summary is further shown in segments 624 and 626. Segment 624 shows the CPU utilization for the top 10 node objects and segment 626 shows the IOPS for top ten SVMs. The "top 10" list is generated to highlight objects that are likely to have performance issues.

Referring back to FIG. 6A, in block B606, an object (may be referred to as "root object") associated with an incident/event is identified. As an example, a user may identify the object by using the top ten listing of the screen shot of FIG. 6C. In another aspect, the user may select an object from screen shot 628 of FIG. 6D that provides an object inventory view of various objects that are being monitored by the performance manager 121, at any given time. The object inventory lists the name of the objects, the metrics that are being monitored (for example, latency, IOPS, throughout, utilization and others), any associated objects based on the relationships of FIG. 3B/3C; and any threshold policy that is associated with the objects. In one aspect, the administrator may assign programmable threshold values to the objects, using the screenshot of 628.

Figure 6E:
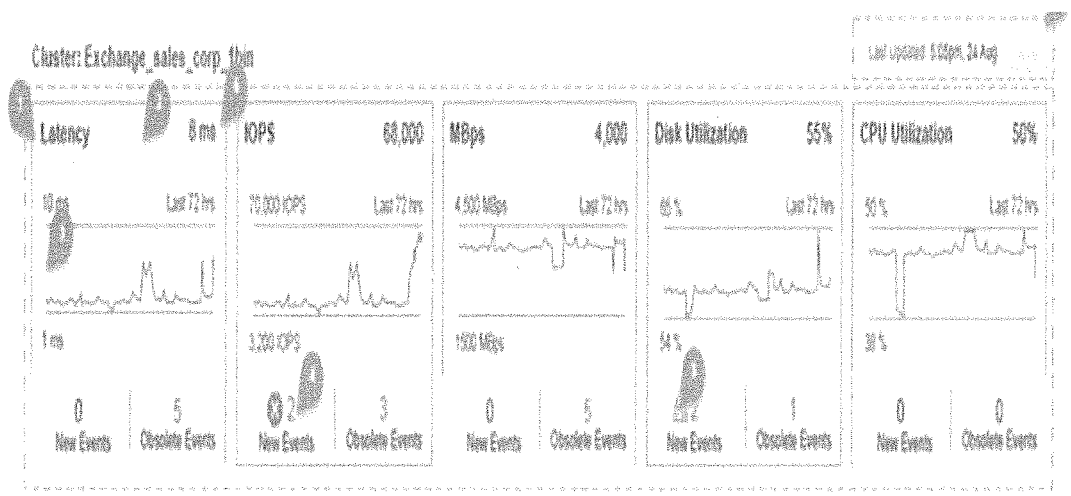

FIG. 6E shows an example of a performance view for an object within screenshot 630. The object view provides latency, IOPS, throughput (MBPS), disk utilization, node utilization, CPU utilization or any other parameter. The performance view of FIG. 6E is customized based on the object type.

Figure 6F:

In block B608, the performance explorer GUI is initiated, so that another resource object can be identified for comparison with the object identified in block B606. An example of the performance explorer is shown in FIG. 6F, which is similar to FIG. 5 that has been described above. The performance explorer is provided to confirm or deny that a resource object is the root cause of a performance issue. The performance explorer may also be used to determine if another resource object may be the root cause of the performance issue. The performance explorer grid may be used to select another object for comparison. The other object is selected based on its relationship with the root object. The various object relationships have been described above in detail.

Figure 6G:
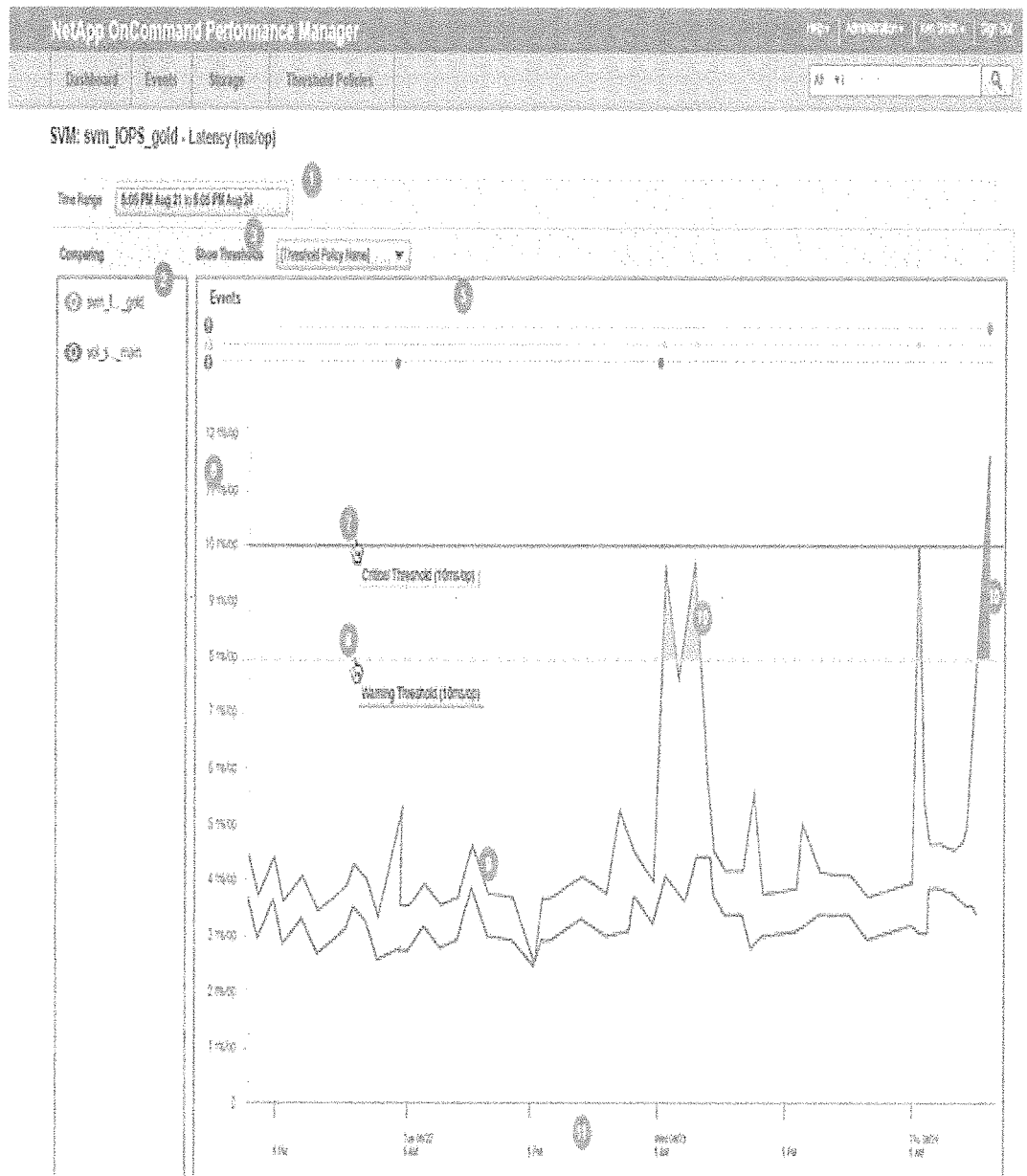

In block B610, the performance of the other object is compared with the performance of the root object. The comparison is based on using performance data for a time period. The comparison may be initiated using the "View and Compare" option 634 from the screen shot of FIG. 6F. An example of the time-series comparison is shown in FIG. 6G, where the latency of the two objects is shown over time. This enables the user to verify in block B612, if the root object or another object is the root cause of a performance issue. If the root object or another object is the root cause, then an appropriate remediation plan can be presented to the user for fixing the performance issue.

Figure 7:
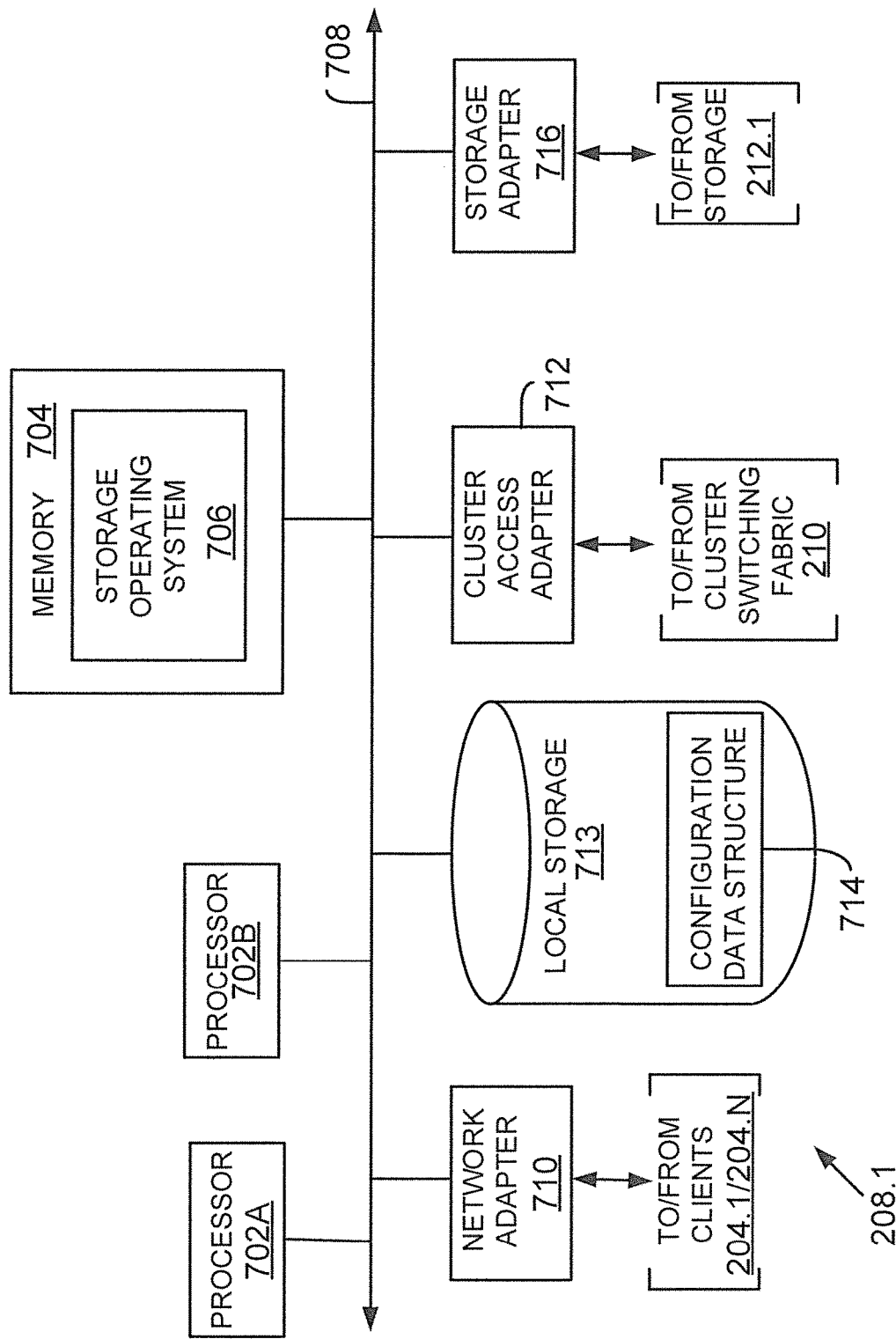
FIG. 7 shows an example of a storage system, used according to one aspect of the present disclosure.

Storage System Node:

FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 717 interconnected by a system bus 708. Node 208.1 may be used to provide QOS information to performance manager 121 described above.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 713 comprises one or more storage devices utilized by the node to locally store configuration information for example, in a configuration data structure 714. The configuration information may include information regarding storage volumes and the QOS associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing a storage operating system 706 (similar to 107, FIG. 1) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 706 portions of which is typically resident in memory and executed by the processing elements, functionally organizes the node 208.1 by, inter alia, invoking storage operation in support of the storage service implemented by the node.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
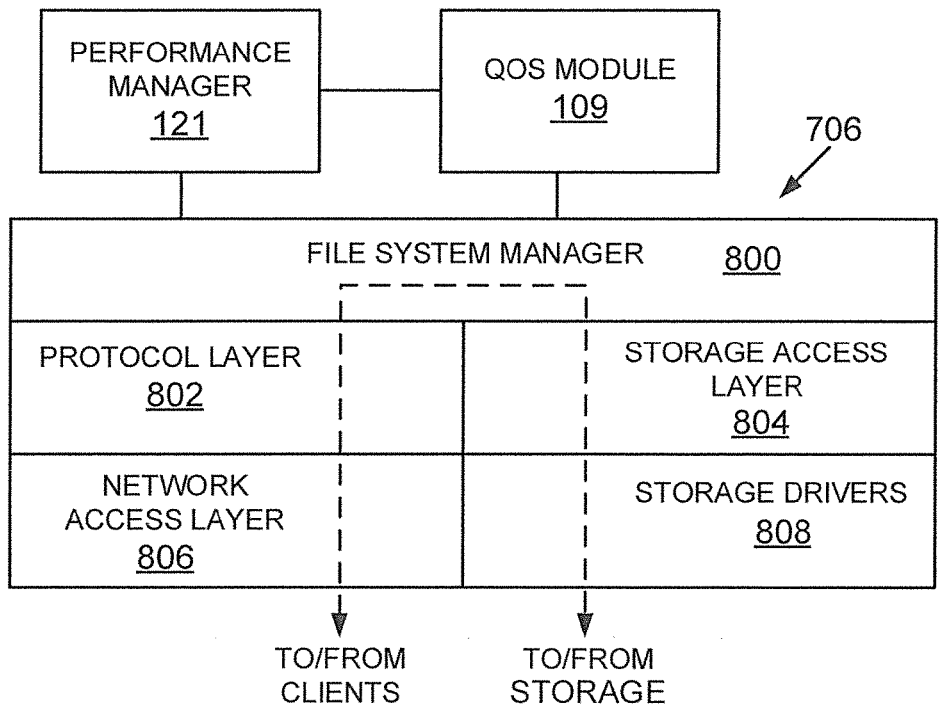
FIG. 8 shows an example of a storage operating system, used according to one aspect of the present disclosure.

Operating System:

FIG. 8 illustrates a generic example of storage operating system 706 (or 107, FIG. 1) executed by node 208.1, according to one aspect of the present disclosure. The storage operating system 706 interfaces with the QOS module 109 and the performance manager 121 such that proper bandwidth and QOS policies are implemented at the storage volume level.

In one example, storage operating system 706 may include several modules, or "layers" executed by one or both of network module 214 and storage module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow storage module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any tyke of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
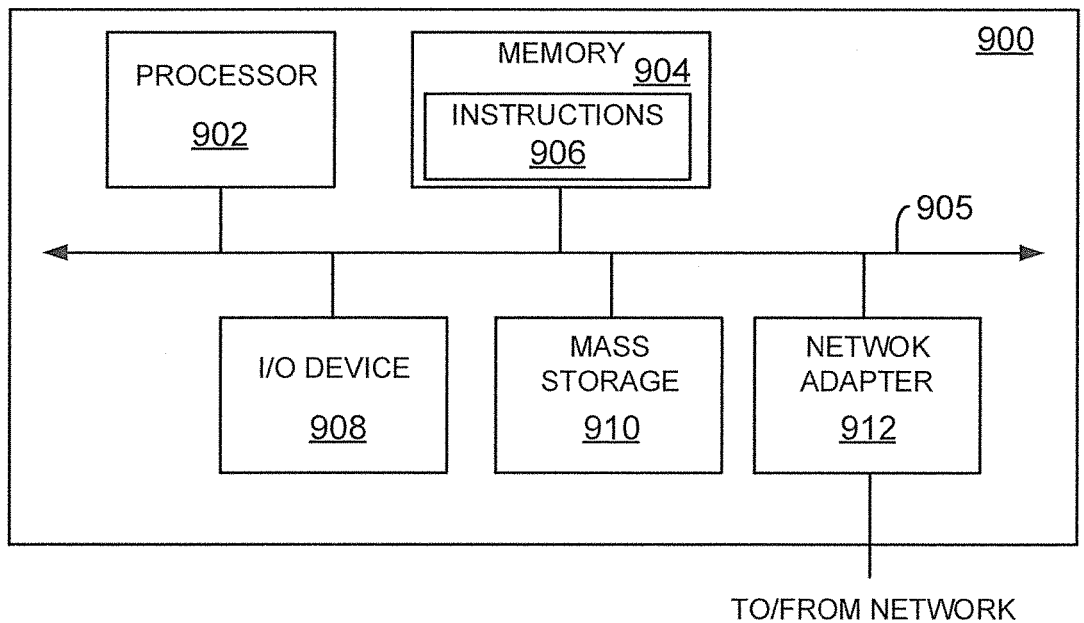
FIG. 9 shows an example of a processing system, used according to one aspect of the present disclosure.

Processing System:

FIG. 9 is a high-level block diagram showing an example of the architecture of a processing system 900 that may be used according to one aspect. The processing system 900 can represent performance manager 121, host system 102, management console 118, clients 116, 204, or storage system 108. Note that certain standard and well-known components which are not germane to the present aspects are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps described above may reside in and executed by processors 902 from memory 904. For example, instructions 906 may be used to implement the forecasting module 223, detection module 225 and incident analysis module 227, according to one aspect.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Thus, methods and apparatus for collecting, monitoring and trouble shooting performance issues have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   tracking performance of a plurality of resources used for reading and writing information at storage devices in a networked storage system, each resource represented by a logical object in a hierarchical structure and performance data associated with each logical object is maintained by a processor executing a management application out of a memory device;
   identifying a root object associated with a resource having a performance issue as indicated by a threshold violation for the resource;
   selecting a related object associated with another resource based on a performance issue type and a relationship between the related object and the root object by the management application for comparing performance data of the root object with the related object; and
   using the comparison to verify that the root object is a root cause of the performance issue.

2. The method of claim 1, wherein the plurality of resources include a cluster having a plurality of nodes, a plurality of storage devices managed by the plurality of nodes for storing data, a switch connecting the cluster nodes and a plurality of network interface cards for the plurality of nodes used by computing devices to access the storage devices.

3. The method of claim 1, wherein performance of the plurality of resources is indicated by a latency value that provides a delay in processing a workload.

4. The method of claim 1, wherein performance of the plurality of resources is indicated by a number of input/output operations (IOPS) processed by the plurality of resources.

5. The method of claim 1, wherein the management application provides a first segment with a listing of physically or logically related objects to the root object with an option to select the related object for comparison with the root object.

6. The method of claim 5, wherein the management application provides a second segment where a plurality of related objects are stored but not all of the related objects are made visible on a display device.

7. The method of claim 5, wherein the management application provides a third segment that displays performance charts for the related object selected using the first segment.

8. A non-transitory, machine readable storage medium having stored thereon instructions for performing a method, comprising machine executable code which when executed by at least one machine, causes the machine to:
   track performance of a plurality of resources used for reading and writing information at storage devices in a networked storage system, each resource represented by a logical object in a hierarchical structure and performance Odata associated with each logical object is maintained by a processor executing a management application out of a memory device;
   identify a root object associated with a resource having a performance issue as indicated by a threshold violation for the resource;
   select a related object associated with another resource based on a performance issue type and a relationship between the related object and the root object by the management application for comparing performance data of the root object with the related object; and
   use the comparison to verify that the root object is a root cause of the performance issue.

9. The storage medium of claim 8, wherein the plurality of resources include a cluster having a plurality of nodes, a plurality of storage devices managed by the plurality of nodes for storing data, a switch connecting the cluster nodes and a plurality of network interface cards for the plurality of nodes used by computing devices to access the storage devices.

10. The storage medium of claim 8, wherein performance of the plurality of resources is indicated by a latency value that provides a delay in processing a workload.

11. The storage medium of claim 8, wherein performance of the plurality of resources is indicated by a number of input/output operations (IOPS) processed by the plurality of resources.

12. The storage medium of claim 8, wherein the management application provides a first segment that provides a listing of physically or logically related objects to the root object with an option to select the related object for comparison with the root object.

13. The storage medium of claim 12, wherein the management application provides a second segment where a plurality of related objects are stored but not all of the related objects are made visible on a display device.

14. The storage medium of claim 12, wherein the management application provides a third segment that displays performance charts for the related object selected using the first segment.

15. A system comprising:
   a memory containing machine readable medium comprising machine executable code having stored thereon instructions; and a processor module coupled to the memory, the processor module configured to execute the machine executable code to:
   track performance of a plurality of resources used for reading and writing information at storage devices in a networked storage system, each resource represented by a logical object in a hierarchical structure and performance data associated with each logical object is maintained by a processor executing a management application out of a memory device;
   identify a root object associated with a resource having a performance issue as indicated by a threshold violation for the resource;
   select a related object associated with another resource based on a performance issue type and a relationship between the related object and the root object by the management application for comparing performance data of the root object with the related object; and use the comparison to verify that the root object is a root cause of the performance issue.

16. The system of claim 15, wherein the plurality of resources include a cluster having a plurality of nodes, a plurality of storage devices managed by the plurality of nodes for storing data, a switch connecting the cluster nodes and a plurality of network interface cards for the plurality of nodes used by computing devices to access the storage devices.

17. The system of claim 16, wherein performance of the plurality of resources is indicated by a latency value that provides a delay in processing a workload.

18. The system of claim 16, wherein the management application provides a first segment that provides a listing of physically or logically related objects to the root object with an option to select the related object for comparison with the root object.

19. The system of claim 18, wherein the management application provides a second segment where a plurality of related objects are stored but not all of the related objects are made visible on a display device.

20. The system of claim 18, wherein the management application provides a third segment that displays performance charts for the related object selected using the first segment.

* * * * *